US008512132B2

(12) United States Patent
Nicely

(10) Patent No.: US 8,512,132 B2
(45) Date of Patent: Aug. 20, 2013

(54) UNIVERSALLY COMPLIANT MULTI-CURRENCY PROGRESSIVE JACKPOT SYSTEM

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/252,969

(22) Filed: Oct. 4, 2011

(65) Prior Publication Data

US 2013/0084966 A1 Apr. 4, 2013

Related U.S. Application Data

(60) Provisional application No. 61/541,932, filed on Sep. 30, 2011.

(51) Int. Cl.
*A63F 13/00* (2006.01)

(52) U.S. Cl.
USPC .................................. 463/27; 463/25; 463/26

(58) Field of Classification Search
USPC ...................................................... 463/25–27
See application file for complete search history.

(56) References Cited

U.S. PATENT DOCUMENTS

| | | | | |
|---|---|---|---|---|
| 6,592,460 | B2 * | 7/2003 | Torango | 463/27 |
| 6,887,152 | B2 * | 5/2005 | Stanek | 463/17 |
| 7,384,336 | B2 * | 6/2008 | Torango | 463/27 |
| 7,857,697 | B2 * | 12/2010 | Govender | 463/25 |
| 2003/0069059 | A1 * | 4/2003 | Stanek | 463/17 |
| 2003/0139212 | A1 * | 7/2003 | Fulton | 463/17 |
| 2004/0152511 | A1 * | 8/2004 | Nicely et al. | 463/27 |
| 2008/0242391 | A1 * | 10/2008 | Nilsson et al. | 463/16 |

* cited by examiner

*Primary Examiner* — Dmitry Suhol
*Assistant Examiner* — David Duffy
(74) *Attorney, Agent, or Firm* — Foley & Lardner LLP

(57) ABSTRACT

Disclosed herein are techniques and equipment for providing a multi-currency progressive jackpot system. In addition to a primary jackpot currency, other currencies may participate in the jackpot as well. If any currency wins the jackpot, the jackpot resets for all currencies.

39 Claims, 7 Drawing Sheets

UNIVERSALLY COMPLIANT MULTI-CURRENCY PROGRESSIVE JACKPOT SYSTEM

CROSS-REFERENCE TO RELATED APPLICATION

This application claims priority to U.S. Patent Application No. 61/541,932, entitled "UNIVERSALLY COMPLIANT MULTI-CURRENCY PROGRESSIVE JACKPOT SYSTEM" filed Sep. 30, 2011, which is incorporated herein by reference in its entirety and for all purposes.

TECHNICAL FIELD

The present disclosure relates generally to wager-based gaming machines and systems, and more specifically to multi-currency progressive jackpot systems for use with wager-based gaming systems.

BACKGROUND

Entities offering wager gaming may provide various incentives to induce players to engage in continued or increased revenue-generating game play. For example, many gaming operators offer progressive jackpots as a player incentive. Such jackpots are typically funded using a portion of each wager bet over one or more of gaming machines. A player typically has a lower chance of achieving a progressive jackpot than achieving a non-progressive winning outcome in a game offered by the gaming machine, but because progressive jackpots grow over time until they are won, progressive jackpots are also typically larger than most if not all individual non-progressive award amounts.

SUMMARY

In some implementations, a wager gaming technique is provided, the technique including (a) identifying a primary currency for participation in a multi-currency progressive (MCP) jackpot having an MCP jackpot cycle and (b) determining an overall return-to-player (RTP) for the MCP jackpot with respect to the primary currency. The technique may further include (c) identifying a secondary currency for participation in the MCP jackpot, the secondary currency different from the primary currency, and (d) determining an exchange rate between the primary currency and the secondary currency, the exchange rate temporally linked to the MCP jackpot cycle. The technique may also include (e) determining a seed amount of the secondary currency which, when added to an amount of average total expected wager contributions for the MCP jackpot during the MCP jackpot cycle, produces an overall RTP for the MCP jackpot with respect to the secondary currency which is substantially the same as the overall RTP for the MCP jackpot with respect to the primary currency.

In some implementations, the technique may further include (f) initializing a secondary currency meter with at least a first amount of the seed amount. In some further implementations, the technique may also include (g) transferring a second amount of the seed amount into a secondary escrow associated with the secondary currency meter, (h) offering the MCP jackpot for play, and (i) transferring one or more portions of the second amount to the secondary currency meter from the secondary escrow while the MCP jackpot is offered for play.

In some implementations, the technique may also include (g) receiving one or more first monetary contributions towards the progressive jackpot from a first gaming machine, each first monetary contribution taken from a wager in the primary currency on the first gaming machine and (h) receiving one or more second monetary contributions towards the progressive jackpot from a second gaming machine, each second monetary contribution taken from a wager in the secondary currency on the second gaming machine. The technique may also include (i) incrementing a primary currency meter by each received first monetary contribution, (j) incrementing the primary currency meter by an amount of the primary currency equal to each received second monetary contribution in absolute monetary terms, (k) incrementing the secondary currency meter by each received second monetary contribution, and (l) incrementing the secondary currency meter by an amount of the secondary currency equal to each received first monetary contribution in absolute monetary terms.

In some implementations, the technique may further comprise repeating steps (g), (i), and (l), as outlined above for one or more additional first gaming machines and repeating steps (h), (j), and (k) for one or more additional second gaming machines. The technique may further include determining that the MCP jackpot has been won by a first wager of the wagers from which the first and second monetary contributions are received and awarding an amount indicated by the currency meter corresponding with the currency of the first wager. The technique may also include resetting the first currency meter and the secondary currency meter; and initiating another MCP jackpot cycle. In some implementations of the technique, each first monetary contribution may be equal to each second monetary contribution in absolute monetary terms.

In some implementations of the technique, the transferring from the secondary escrow to the secondary currency meter occurs over an extended period of time and until the second amount of the secondary currency is entirely transferred to the secondary currency meter. In some implementations of the technique, the transferring occurs at a first rate, the first rate calculated based on the second amount of the secondary currency and a predicted average duration of the MCP jackpot cycle.

Some implementations of the technique further include (m) transferring a second amount of the seed amount into a secondary escrow associated with the secondary currency meter and (n) offering the MCP jackpot for play. The technique may also include transferring one or more portions of the second amount to the secondary currency meter from the secondary escrow while the MCP jackpot is offered for play. The transferring from the secondary escrow to the secondary currency meter may occur each time the secondary currency meter is incremented and the portions transferred may each be substantially equal to the second amount of the secondary currency divided by a predicted average number of first and second monetary contributions which will be received during the MCP jackpot cycle.

In some implementations of the technique, steps a) through e) are repeated for multiple MCP jackpot cycles. Some implementations of the technique may further include, for each MCP jackpot cycle, initializing a secondary currency meter with at least a first amount of the seed amount, wherein, for each MCP jackpot cycle, the first amount is the same.

In some implementations of the technique, the first amount is a round number. For example, in some implementations, the first amount may be a multiple of 5.

Some implementations of the technique may further include identifying one or more additional, different secondary currencies for participation in the MCP jackpot and repeating steps c) through e) for each of the one or more additional, different secondary currencies.

In some implementations, a wager gaming system is provided. The wager gaming system may include one or more servers, the one or more servers including a memory, one or more processors, an input interface, and a communications link communicatively connected with each other. The one or more servers may be configured to (a) receive input, via the input interface, identifying a primary currency for participation in an MCP jackpot having an MCP jackpot cycle and b) receive information, via the input interface, indicating an overall return-to-player (RTP) for the MCP jackpot with respect to the primary currency. The one or more servers may be further configured to c) receive, via the input interface, input identifying a secondary currency for participation in the MCP jackpot, the secondary currency different from the primary currency; d) retrieve, via the communications link, an exchange rate between the primary currency and the secondary currency, the exchange rate temporally linked to the MCP jackpot cycle. The one or more servers may also be configured to e) determine a seed amount of the secondary currency which, when added to an amount of average total expected wager contributions for the MCP jackpot during the MCP jackpot cycle, produces an overall RTP for the MCP jackpot with respect to the secondary currency which is substantially the same as the overall RTP for the MCP jackpot with respect to the primary currency.

In some wager gaming system implementations, the one or more servers may be configured to (f) initialize a secondary currency meter with at least a first amount of the seed amount. In some further wager gaming system implementations, the one or more servers may be further configured to (g) transfer a second amount of the seed amount into a secondary escrow associated with the secondary currency meter, (h) offer the MCP jackpot for play, and (i) transfer one or more portions of the second amount to the secondary currency meter from the secondary escrow while the MCP jackpot is offered for play.

In some wager gaming system implementations, the one or more servers may be configured to (g) receive one or more first monetary contributions towards the progressive jackpot from a first gaming machine, each first monetary contribution taken from a wager in the primary currency on the first gaming machine and (h) receive one or more second monetary contributions towards the progressive jackpot from a second gaming machine, each second monetary contribution taken from a wager in the secondary currency on the second gaming machine. The one or more servers may also be configured to (i) increment a primary currency meter by each received first monetary contribution, (j) increment the primary currency meter by an amount of the primary currency equal to each received second monetary contribution in absolute monetary terms, (k) increment the secondary currency meter by each received second monetary contribution, and (l) increment the secondary currency meter by an amount of the secondary currency equal to each received first monetary contribution in absolute monetary terms.

In some wager gaming system implementations, the one or more servers may be further configured to repeat steps (g), (i), and (l) for one or more additional first gaming machines and repeat steps (h), (j), and (k) for one or more additional second gaming machines. The one or more servers may also be configured to determine that the MCP jackpot has been won by a first wager of the wagers from which the first and second monetary contributions are received, award an amount indicated by the currency meter corresponding with the currency of the first wager, reset the first currency meter and the secondary currency meter, and initiate another MCP jackpot cycle.

In some wager gaming system implementations, each first monetary contribution may be equal to each second monetary contribution in absolute monetary terms.

In some wager gaming system implementations, the one or more servers may be further configured to transfer the one or more portions of the second amount from the secondary escrow to the secondary currency meter over an extended period of time and until the second amount of the secondary currency is entirely transferred to the secondary currency meter. In some wager gaming system implementations, the one or more servers may be further configured to transfer the one or more portions of the second amount from the secondary escrow to the secondary currency meter at a first rate, the first rate calculated based on the second amount of the secondary currency and a predicted average duration of the MCP jackpot cycle.

In some wager gaming system implementations, the one or more servers may be further configured to (m) transfer a second amount of the seed amount into a secondary escrow associated with the secondary currency meter; (n) offer the MCP jackpot for play; and (o) transfer one or more portions of the second amount to the secondary currency meter from the secondary escrow while the MCP jackpot is offered for play. In such implementations, the one or more servers may be further configured to transfer the one or more portions of the second amount from the secondary escrow to the secondary currency meter each time the secondary currency meter is incremented, and the portions transferred may each be substantially equal to the second amount of the secondary currency divided by a predicted average number of first and second monetary contributions which will be received during the MCP jackpot cycle.

In some wager gaming system implementations, the one or more servers may be further configured to repeat a) through e) for multiple MCP jackpot cycles. In some wager gaming system implementations, the one or more servers may be further configured to, for each MCP jackpot cycle, initialize a secondary currency meter with at least a first amount of the seed amount, wherein, for each MCP jackpot cycle, the first amount is the same.

In some wager gaming system implementations, the first amount may be a round number. For example, the first amount may be a multiple of 5.

In some wager gaming system implementations, the one or more servers may be further configured to receive, via the input interface, input identifying one or more additional, different secondary currencies for participation in the MCP jackpot and repeat c) through e) for each of the one or more additional, different secondary currencies.

In some implementations, computer software stored on at least one machine-readable medium may be provided. The computer software may include instructions for controlling devices in a gaming network to (a) identify a primary currency for participation in a multi-currency progressive (MCP) jackpot having an MCP jackpot cycle and (b) determine an overall return-to-player (RTP) for the MCP jackpot with respect to the primary currency. The software may also include instructions for controlling the devices in the gaming network to (c) identify a secondary currency for participation in the MCP jackpot, the secondary currency different from the primary currency and (d) determine an exchange rate between the primary currency and the secondary currency, the exchange rate temporally linked to the MCP jackpot cycle.

The software may also include instructions for controlling the devices in the gaming network to (e) determine a seed amount of the secondary currency which, when added to an amount of average total expected wager contributions for the MCP jackpot during the MCP jackpot cycle, produces an overall RTP for the MCP jackpot with respect to the secondary currency which is substantially the same as the overall RTP for the MCP jackpot with respect to the primary currency.

In some machine-readable medium implementations, the software may also include instructions for controlling the devices in the gaming network to (f) initialize a secondary currency meter with at least a first amount of the seed amount.

In some machine-readable medium implementations, the software may also include instructions for controlling the devices in the gaming network to (g) transfer a second amount of the seed amount into a secondary escrow associated with the secondary currency meter, (h) offer the MCP jackpot for play, and (i) transfer one or more portions of the second amount to the secondary currency meter from the secondary escrow while the MCP jackpot is offered for play.

In some machine-readable medium implementations, the software may also include instructions for controlling the devices in the gaming network to (m) receive one or more first monetary contributions towards the progressive jackpot from a first gaming machine, each first monetary contribution taken from a wager in the primary currency on the first gaming machine and (n) receive one or more second monetary contributions towards the progressive jackpot from a second gaming machine, each second monetary contribution taken from a wager in the secondary currency on the second gaming machine. The software may also include instructions for controlling the devices in the gaming network to (o) increment a primary currency meter by each received first monetary contribution and (p) increment the primary currency meter by an amount of the primary currency equal to each received second monetary contribution in absolute monetary terms. The software may further include instructions for controlling the devices in the gaming network to (q) increment the secondary currency meter by each received second monetary contribution and (r) increment the secondary currency meter by an amount of the secondary currency equal to each received first monetary contribution in absolute monetary terms.

In some machine-readable medium implementations, the software may also include instructions for controlling the devices in the gaming network to repeat g), i), and l) for one or more additional first gaming machines and repeat h), j), and k) for one or more additional second gaming machines. The software may further include instructions for controlling the devices in the gaming network to determine that the MCP jackpot has been won by a first wager of the wagers from which the first and second monetary contributions are received and award an amount indicated by the currency meter corresponding with the currency of the first wager. The software may also include instructions for controlling the devices in the gaming network to reset the first currency meter and the secondary currency meter and initiate another MCP jackpot cycle.

In some machine-readable medium implementations, each first monetary contribution may be equal to each second monetary contribution in absolute monetary terms. In some machine-readable medium implementations, the transferring from the secondary escrow to the secondary currency meter occurs over an extended period of time and until the second amount of the secondary currency is entirely transferred to the secondary currency meter. In some machine-readable medium implementations, the transferring occurs at a first rate, the first rate calculated based on the second amount of the secondary currency and a predicted average duration of the MCP jackpot cycle.

In some machine-readable medium implementations, the software may also include instructions for controlling the devices in the gaming network to (p) transfer a second amount of the seed amount into a secondary escrow associated with the secondary currency meter, (q) offering the MCP jackpot for play; and (r) transfer one or more portions of the second amount to the secondary currency meter from the secondary escrow while the MCP jackpot is offered for play. The transferring from the secondary escrow to the secondary currency meter may occur each time the secondary currency meter is incremented, and the portions transferred may each be substantially equal to the second amount of the secondary currency divided by a predicted average number of first and second monetary contributions which will be received during the MCP jackpot cycle.

In some machine-readable medium implementations, a) through e) may be repeated for multiple MCP jackpot cycles. In some machine-readable medium implementations, the software may also include instructions for further controlling the devices in the gaming network to, for each MCP jackpot cycle, initialize a secondary currency meter with at least a first amount of the seed amount, wherein, for each MCP jackpot cycle, the first amount is the same.

In some machine-readable medium implementations, the first amount may be a round number. For example, the first amount may be a multiple of 5.

In some machine-readable medium implementations, the software may also include instructions for controlling the devices in the gaming network to identify one or more additional, different secondary currencies for participation in the MCP jackpot and repeat c) through e) for each of the one or more additional, different secondary currencies.

BRIEF DESCRIPTION OF THE DRAWINGS

The included drawings are for illustrative purposes and serve only to provide examples of possible structures and process steps for the disclosed inventive systems, methods, and apparatuses for providing multi-currency progressive jackpots for wagering game play. These drawings in no way limit any changes in form and detail that may be made to implementations by one skilled in the art without departing from the spirit and scope of the disclosure.

DETAILED DESCRIPTION

Figure 1:
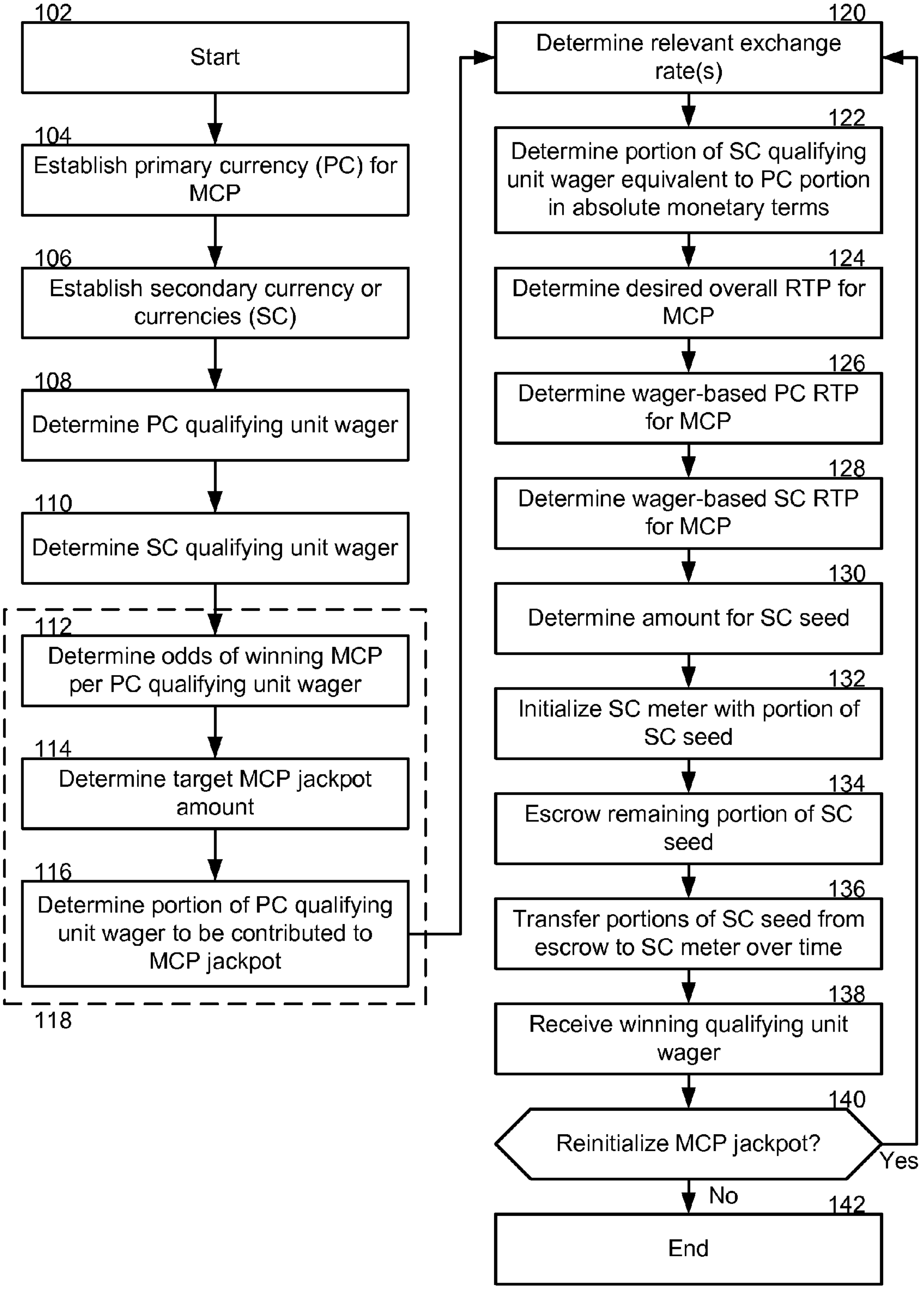
FIG. 1 depicts a high-level flow diagram for one technique outlined in this disclosure.

Although the following text sets forth a detailed description of numerous different embodiments, it should be understood that the legal scope of the invention is defined by the words of the claims set forth at the end of this patent. The detailed description is to be construed as an example only and does not describe every possible embodiment since describing every possible embodiment would be impractical, if not impossible. Numerous alternative embodiments may be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

DEFINITIONS

Absolute Monetary Value: The absolute monetary value is the value of an amount of a currency with respect to a reference currency relative to a specific reference currency exchange rate established at a particular point in time. The absolute monetary value may remain constant—even though the actual currency exchange rate may fluctuate continuously with time—until the reference exchange rate is changed. For example, the absolute monetary value of £100 with respect to a reference currency of US dollars would be $165 if the exchange rate is $1.65:£1. The absolute monetary value may be tied to a point in time or a period of time to take into account fluctuations in exchange rates. It may be, for example, calculated based on the daily average of the exchange rate over the last 30 days. An alternatively calculation may be based on the lowest exchange rate in the last week or at the end of the last calendar month. In some situations, a constant currency exchange rate is established for a specified period of time such as a regular period such as daily, weekly, monthly or a context-specific period such as the period of time until the progressive jackpot is won by a player, or such as the period of time until the initiation of play on a game that can win the progressive jackpot or such as the period of time in which the current real-world exchange rate changes by more than a specific amount or by more than a specific percentage relative to the reference currency exchange rate used by the gaming system.

X is less than/equal to/greater than Y in absolute monetary terms: A comparison between two currency amounts in which the phrase "in absolute monetary terms" is used refers to a comparison which is to be made by comparing the absolute monetary value of one of the currency amounts in terms of the other currency to the other currency amount. For example, X may have a value of $150 and Y may have a value of £100. In absolute monetary terms and using the exchange rate of $1.65:£1, X is less than Y, even though X has more dollars than Y has of pounds.

Temporally Linked: In the context of exchange rates and progressive jackpots, exchange rates which are temporally linked to a particular progressive jackpot share some common relationship with the progressive jackpot because of some commonality between the time periods each is in effect. Progressive jackpots grow over a period of time, and typically terminate when a player wins the progressive jackpot. This period of time may also be referred to as a "cycle." Exchange rates often fluctuate over time, and are often specified with respect to a period of time, e.g., $1.65:£1 for Aug. 24, 2011; $1.55:£1 for August 25; etc. Examples of temporal linking of exchange rates to progressive jackpots could include: (a) using the exchange rate for a given date for a progressive jackpot which is initiated on the given date, (b) using the average exchange rate for the 30 consecutive days for a progressive jackpot which is initiated on a given date coinciding with the end of the 30-day period, and (c) using the average exchange rate for the previous calendar month for a progressive jackpot which is initiated in a given month.

Return to Player (RTP): In the context of a gambling proposition, the RTP represents the long-term expected payback that players as a whole are expected to receive over a very large number of games, said payback being the ratio of jackpot awards paid relative to total wagers placed. The actual RTP that a given player experiences can, and will, vary greatly from the long-term expected RTP, relative to how many games said player plays. The actual RTP for a player is the ratio of the player's actual amount won to the player's actual amount wagered over a given period of time. The larger the number of games a given player plays, the more likely that the player's actual RTP will trend towards the long-term expected RTP, but typically a given player would need to play in excess of 100,000 or 1,000,000 game plays before their actual RTP is likely to be close to the long-term expected RTP. In the context of a progressive jackpot gambling proposition, the long-term expected payback is based on the effect of a very large number of jackpots awarded over a very large number of games, thus reflecting the expected payback of the average jackpot award. The instantaneous RTP for a progressive jackpot gambling proposition represents the long-term expected RTP for a proposition with the current win odds and the current jackpot value of said proposition. Thus the instantaneous RTP of a given progressive jackpot increases as the progressive jackpot value increases over the course of the progressive jackpot cycle until the jackpot progressive is awarded and a replacement jackpot progressive at a lower starting value is activated. For example, consider a progressive jackpot with odds of 1000:1 which is funded using 4% of each $2 wager, i.e, $0.08 of each wager. On average, there will be a winner of such a progressive jackpot every 1000 wagers, which results in a progressive jackpot growth of $80=$0.08·1000 games. The long-term expected RTP is therefore $80 of award per $2·1000 games, or $80/$2000, which equals 4%. This is consistent with the fact that 4% of wagers are going to the progressive jackpot which in turn funds the progressive jackpot growth. However, if, for example, the same jackpot was initiated with a $100 seed value, the RTP would then be ($100+$80)/(1000·$2)= 0.09=9%. As is evident, in a progressive jackpot in which the winnings are solely derived from contributions from players' wagers, e.g., a seedless progressive jackpot, the RTP percentage will be the same as the percentage of each wager which is contributed to the progressive jackpot. In seeded progressive jackpots, the "overall RTP" percentage can be thought of as being the sum of two RTP percentages—the RTP percentage derived from the portion of player's wagers which fund the progressive jackpot ("wager-derived RTP"), and the RTP percentage derived from the seed value divided by the average total amount wagered before the progressive jackpot is won ("seed RTP"). In a case where multiple currencies contribute to a progressive jackpot which may be won by a wager in any one of the currencies, each currency may have its own RTP, which is calculated based on the assumption that only wagers in that currency are made. As used herein and in the claims, "RTP" is to be understood to refer to long-term expected RTP. Any use of "instantaneous" in conjunction with "RTP" or "actual" in conjunction with "RTP" will be understood to refer to the instantaneous RTP and actual RTP as described above.

Qualifying Wager: For a given progressive jackpot, a qualifying wager is a wager which, when made, which is eligible to win the progressive jackpot. In some regulatory jurisdictions, only portions of qualifying wagers can be used to increase a progressive jackpot. In other jurisdictions, portions of both qualifying and non-qualifying wagers can be used to increase a progressive jackpot. In some progressive jackpots, only one wagering amount may be a qualifying wager, e.g., MAX bet (assuming all maximum bets in participating machines are the same amount). In other progressive jackpots, several different wagering amounts may be qualifying wagers.

Qualifying Unit Wager: For a given odds of winning a progressive jackpot, the qualifying unit wager is the amount which, when wagered, produces those odds. In progressive jackpots which do not support multi-level wagering, the odds of winning are typically expressed in terms of the chance for any given wager to win the progressive jackpot. For example, in a progressive jackpot where all qualifying wagers are $2, the odds of winning may be expressed as 1 in 1000 wagers. The qualifying unit wager in such a scenario is $2. Some progressive jackpots may allow for multiple bet levels, in which case the odds of winning for any given qualifying wager may need to be scaled based on the ratio of the wager made to the qualifying unit wager. For example, if the qualifying unit wager is $1, but a player may make a $1, $2, or $3 qualifying wager, the odds for each particular wager may scale linearly with the increase in the wagering amount over the qualifying unit wager, i.e., a $2 wager may have twice the chance of winning the progressive jackpot as the $1 wager, and the $3 wager may have three times the chance of winning the progressive jackpot as the $1 wager. For MCP jackpots, there may be different qualifying unit wagers for each currency type.

Progressive Seed: In the context of this application, the progressive seed, or simply "seed," is an amount of money which is used to fund a progressive jackpot but which does not result in a chance to win that progressive jackpot. Seed money, for example, is often contributed by the gaming operator offering the progressive jackpot. Another source for seed money is to use money drawn from wager contributions to a previous progressive jackpot. For example, a gaming operator may fund the first jackpot for a progressive jackpot using funds designated for marketing expenses, i.e., casino overhead. A sub-portion of each portion of each wager which is used to fund the first jackpot may be set aside to fund a second, follow-on jackpot. While the sub-portions are drawn from portions of wagers which may be eligible to win the first jackpot, the sub-portions fund the second jackpot, which the wagers are not eligible to win.

Meter/Meter Amount: A meter, or meter amount, in the context of the present application, refers to an accumulator which records the value of a progressive jackpot over time. It may also be used to refer to a device which reports out the current value of the progressive jackpot over time. In some cases, there will be only one meter which tracks the actual accumulation of funds for a progressive jackpot, and the other meters will simply report out whatever value that meter indicates. In other cases, however, there may be multiple meters which track different sources of jackpot funds. For example, in a multi-currency progressive jackpot, there may be a meter for each currency participating in the jackpot. There may also be a master meter which is referenced by each currency meter; the master meter may track contributions from players. Each currency meter may include an amount of the corresponding currency which is equivalent to the master meter amount in absolute monetary terms, but may also include additional funds from other sources, such as a currency-specific seed amount.

Cycle: A cycle, in the context of progressive jackpots, indicates the period of time and/or number of games played between the initialization or re-initialization of an MCP jackpot and the awarding of that jackpot. In certain gaming systems, a plurality of MCP jackpots may be available for the player to win. Usually, though not always, each MCP jackpot award is independent of other jackpots, therefore each jackpot has its own cycle.

Applicants wish to note that various examples involving numerical calculation are given throughout this paper. In many cases, the results of such calculations are shown rounded to the nearest hundredth. However, in practice, such calculations may be performed to a much higher degree of precision, and rounding may not be used, may be minimized to the extent possible, or may be replaced with some other technique, such as flooring to the nearest payable currency unit, such as $0.01 or 1 cent in United States Dollars or Rp 50 in Indonesian Rupiah.

All of the following methods and processes, along with other methods and processes of the present invention, may be implemented by software, firmware and/or hardware. For example, the methods of the present invention may be implemented by computer programs embodied in machine-readable media. The invention may be implemented by networked gaming machines, game servers and/or other such devices. Those of skill in the art will appreciate that the steps of the methods described herein are not necessarily performed (and in some implementations are not performed) in the order shown. Moreover, some implementations of the methods described herein may include more or fewer steps than those shown and/or described.

In practical terms, some example server-based or distributed logic systems, as described herein, may be used to provide a multi-currency progressive which provides substantially the same RTP to players regardless of what currency each player wagers in. Such examples may allow players to avoid some potential issues with other MCP systems as a result of currency exchange rate fluctuations, while allowing gaming operators to operate MCPs which are funded using consistent contributions from each qualifying wager regardless of currency. Such examples of logic systems may allow gaming operators to offer players playing in lower-liquidity currencies a chance to play in a high-liquidity progressive.

In one implementation, a multi-currency progressive (MCP) may be implemented to provide a progressive jackpot award which is funded via two or more different currencies, and which may be distributed to a winning player using the player's wagering currency or, in some cases, a currency of the player's choice. An MCP may be thought of as including a primary currency and one or more secondary currencies. The MCP jackpot is displayed to players using the primary currency via a primary currency meter, and to players using the one or more secondary currencies via meters for those respective secondary currencies. Generally speaking, the amounts shown on each currency meter may be different.

The choice of which currency in the MCP will serve as the "primary" currency and which currency or currencies will serve as the "secondary" currency or currencies is a primarily a matter of operator preference. For a progressive system that operates entirely within a casino, such as within a single game or within a bank of linked games, the operator may be the casino. For a progressive system that operates across multiple casinos, usually referred to as a Wide Area Progressive or WAP, the operator may be the company which manages the network, e.g., a casino, an online casino, a gaming manufacturer, or a progressive systems network provider. For example, for an online casino whose player base mostly plays in British £, such a casino would likely select £ as the primary currency, with any other supported currencies, such as the Euro, as the secondary currency.

For example, an operator may currently operate a fairly quick, i.e., relatively high rate of jackpot growth, single-currency progressive (SCP) in Britain which is quite popular and a rather sluggish, i.e., relatively low rate of jackpot growth, SCP in the EU. The operator may wish to replace the two independent, SCPs with a single MCP. Due to the fact that the British SCP is already a strong performer, the operator may wish to designate the British £ as the primary currency and the EU € as the secondary currency. In other implementations, an MCP may be configured to support multiple currencies from the start. One difference between the primary currency and the secondary currency is that fewer parameters are changed with respect to the primary currency MCP jackpot during each MCP jackpot cycle than are changed with respect to the secondary currency MCP jackpot, as will become clear from the examples discussed throughout this paper. In some implementations, the configuration of the primary currency MCP jackpot is identical to the configuration of an SCP using the primary currency, whereas the configuration of the secondary currency MCP jackpot for the same MCP may vary from cycle to cycle depending on the exchange rates with respect to the primary currency, as is detailed further in this paper.

Some MCP implementations may be implemented so as to satisfy several overall design paradigms which may arise due to business or regulatory requirements. For example, it may be desired to configure the MCP such that the odds of any individual wager winning the MCP are directly proportional to the absolute monetary value of the portion of the player's wager which is used to fund the MCP. In progressive jackpots in which only one currency is in use, this simply reduces to the odds being directly proportional to the portion of the player's wager which is used to fund the MCP.

Some example implementations of the disclosed paradigms may allow players using any of a variety of different participating currencies in an MCP to place wagers without risk that currency fluctuations will substantially impact the player's RTP in the MCP with respect to their currency of play. Moreover, such examples may allow for players to participate in an MCP without necessarily providing any practical indication to the player that the player is competing against players using other currencies in the MCP. For example, players may not be provided information which may indirectly alert them to the fact that an exchange rate is involved in their play of the MCP.

Another design paradigm which may guide implementation of an MCP is that the odds of winning the MCP are directly proportional to the wager size between qualifying bet sizes within the same currency. For example, if a wagering game allows for $1, $2, and $3 bet levels, and if all of these bet levels qualify for participation in the MCP, then a player betting $2 would be twice as likely to win the MCP as a player betting $1. Similarly, a player betting $3 would be three times more likely to win the MCP than the player betting $1 and 50% more likely to win the MCP than the player betting $2. Some MCPs may include one or more currencies which feature multi-level bets, but other MCPs may only offer a single bet level within each currency.

Yet another design paradigm which may be satisfied by implementations of an MCP as described herein is that the expected average overall MCP return-to-player (RTP) does not change across currencies.

Another design paradigm which may be satisfied by implementations of an MCP is that the odds of winning an MCP jackpot do not change from cycle to cycle for that MCP.

A further design paradigm which may be satisfied by implementations of an MCP is that, for a given MCP, the absolute monetary value contributed by each currency during a given time period and the corresponding odds of winning are proportionally the same.

A discussion of an example SCP may provide useful context for discussing the implementation of MCPs. A particular SCP may, at a high level, be defined by factors such as the overall odds of winning the SCP jackpot per qualifying unit wager, the average estimated SCP jackpot award, the monetary contribution of each qualifying unit wager, and, if implemented, the amount of the SCP seed. Such factors may generally define the RTP for the SCP.

For example, a gaming operator may implement an SCP which is funded by slot machines which accept $1, $2, and $3 bets. To encourage higher wagers, wagers placed at the $2 and $3 bet levels may qualify to be eligible to win the SCP jackpot, whereas wagers placed at the $1 bet level may not. The gaming operator may implement the SCP such that 5% of each qualifying wager is contributed to the SCP jackpot during the SCP jackpot cycle. Thus, $0.10 of each $2 wager and $0.15 of each $3 wager are contributed to funding the SCP jackpot. In some such implementations, the $1 wagers may contribute to the SCP jackpot but have no chance of winning the jackpot. Many jurisdictions, however, prohibit funding a progressive jackpot with contributions from non-qualifying wagers. In this example, the $1 wagers do not contribute to the SCP jackpot and are not eligible to win the SCP jackpot. The gaming operator may further implement the SCP such that the odds of winning the SCP jackpot per qualifying unit wager are 1 in 1000. The qualifying unit wager, in conjunction with the jackpot odds, provides an estimate of the total wagers that will be made per SCP jackpot cycle. In this example, the qualifying unit wager may be the lowest qualifying wager, i.e., $2. Thus, if the odds of winning the SCP are 1 in 1000 per each $2 qualifying unit wager, the gaming operator can expect that average amount wagered each SCP cycle will be 1000 wagers·$2=$2000. Of that $2000 average amount wagered, 5%, i.e., an average of $100, will be used to fund the SCP jackpot for each SCP cycle. In this example, each player making a $2 wager has a 1 in 1000 chance of winning the SCP jackpot as a result of making that wager. Similarly, each player making a $3 wager has a 1.5 in 1000 chance of winning the SCP jackpot as a result of making that wager. Therefore, the average number of $3 plays between each $3 jackpot win is 1000 chances per cycle/1.5 chances per $3 play=666.7 $3 plays per cycle. Thus the gaming operator can expect that average amount wagered each SCP cycle with bets of $3 will be 666.7 wagers·$3=$2000. Of that $2000 average amount wagered, 5%, i.e., an average of $100, will be used to fund the SCP jackpot for each SCP cycle. The overall RTP for this example thus far is the average jackpot amount of $100 divided by the average total amount wagered before the SCP jackpot is won, i.e., $100/$2000=0.05=5%.

The above SCP example may be modified to implement an SCP seed, which is credited to the SCP jackpot meter from a source other than the qualifying wagers. For example, at the start of the SCP, the SCP jackpot meter may be credited with $50 by the SCP jackpot operator. Thus, even in the unlikely event that the first wager made triggers the SCP jackpot win condition, the winner will at least receive the $50 seed amount in addition to the portion of the winning wager which was the winning SCP jackpot contribution. Such an implementation does not change the odds of winning per qualifying unit wager or the monetary contribution of each qualifying unit wager, but does alter the average SCP jackpot and, consequently has an impact on overall RTP. For example, the average SCP jackpot in this example would be $100 (average total funding from qualifying wagers per cycle)+$50 (SCP seed amount per cycle)=$150. Thus, the resulting overall RTP would be $150/$2000=0.075=7.5%.

An implementation of an MCP may share several high-level similarities with an implementation of an SCP, but may also exhibit significant differences, both of which may be observed in the following example implementation of an MCP, in which wagering in both British pounds (£) and European Union (EU) euros (€) is supported. In this example, it is assumed that the relevant exchange rate for British £ to EU € is 1 to 1.25.

FIG. 1 provides a high-level flow diagram of various aspects of such an implementation. After the start of the implementation (102), a primary currency is selected (104)—in this example, the primary currency is British £. A secondary currency, or currencies, is also selected (106)—in this case, there is only one secondary currency, EU €.

A qualifying unit wager for the primary currency may be selected (108), as well as a qualifying unit wager for the secondary currency (110). In this example, the qualifying unit wager for the primary currency has been selected to be £1, and the qualifying unit wager for the secondary currency has been selected to be € 1. In addition, various parameters (118) governing the primary currency MCP jackpot odds and payout may be selected. For example, a desired odds of winning the MCP jackpot may be selected (112), a target MCP jackpot amount in the primary currency may be selected (114), and the portion of each primary currency unit wager to be contributed to the MCP jackpot may be selected (116). In some implementations, some of these parameters may be derived from other parameters. For example, an operator may specify that 5% of each British £ wager is used to fund the MCP jackpot and that the odds of winning the jackpot will be 1 in 1000 for a wager of £1. Accordingly, the British £ MCP jackpot amount in this implementation will be 1000·£1·5%=£50. The jackpot amount referred to in this paragraph is the jackpot amount derived from wagering contributions; as discussed previously, the actual jackpot amount may be boosted by other contributions, such as a seed amount.

As noted above, for an MCP, it may be desirable to have the odds for qualifying unit wagers be the same, regardless of currency. It may also be desirable to have such odds tied to the absolute monetary value of the wager contributions. If one takes into account these principles and applies them to the EU wagers for the MCP, the following may be observed. First, in order for a given EU wager to have the same odds of winning the MCP jackpot as a £1 British wager, the EU wager must contribute an amount with the same absolute monetary value as the 5 pence which is contributed by the £1 British wager (122). Before this amount may be determined, the relevant exchange rate must be obtained and applied to the amount contributed by each qualifying unit wager of the primary currency (120).

The following paragraphs will refrain from referencing FIG. 1, as the following material is not part of the technique shown in FIG. 1, but is presented to provide context for the discussion which follows. Reference to FIG. 1 will resume when this discussion concludes.

One way that the goals outlined in paragraph [0070] may be accomplished is by funding the MCP jackpot using the same percentage from each EU wager as is taken from each British wager (referred to herein as the "fixed percentage approach"). In this case, the amount of EU € which is equivalent to 5 pence in absolute monetary terms at the exchange rate for this example (£1: € 1.25) is 6.25 eurocents. If the EU wager contribution is to be 6.25 eurocents, and the EU wager contribution is also to be 5% of each EU wager, then the EU wager amount will need to be 6.25 eurocents/5%=€ 0.0625/0.05=€ 1.25. The benefit of this is that the wager-derived RTPs for the currencies are the same for a given MCP jackpot.

However, the fixed percentage approach presents several problems. First, exchange rates change over time, and the fixed percentage approach would require that the wagering amounts in the EU would need to change over time to match the fluctuations in the exchange rate. This presents the EU player with varying wagering amounts—such variability is highly undesirable to wager gaming players and may not be compliant with regulatory requirements in most jurisdictions. Second, gaming machines are often configured to offer round-number wagering options, such as € 1, € 2, and € 3. A € 1.25 wagering option in a game would likely look odd to a player, and the player would be less likely play.

Reference is again made to FIG. 1, which may be further described in the following paragraphs.

An alternative to using the same percentage of each wager in either currency is to allow for wagers in either currency to be set to amounts which are tailored to be more acceptable to players using either currency (referred to herein as the "desired wager amount approach"). For example, it is common to have gaming machines configured to accept wagers of $1, € 1, £1, etc. In the example implementation, this may result in British wagers of £1 and EU wagers of € 1 being permitted. However, in order to ensure that each British £1 wager and each EU € 1 wager have the same odds of winning the MCP jackpot, the percentage of each EU wager which is used to fund the MCP may be different from the percentage of each British wager which is used to fund the MCP. For example, if 5 pence of each £1 wager is used to fund the MCP jackpot, 6.25% of each EU wager, i.e., 6.25 eurocents, would need to be used to fund the MCP jackpot as well.

While the wagering amounts in the fixed percentage approach for at least one of the currencies will need to fluctuate when the reference exchange rate changes, the desired wager amount approach requires no such variation. However, unlike the fixed percentage approach, the desired wager amount approach does result in differences in RTP between the two currencies, specifically with respect to the RTP percentage attributable to wagering contributions. For example, the average amount of British £ which would need to be wagered to win the MCP jackpot in this case would be 1000·£1=£1000. Since the MCP jackpot amount would be 1000·5%·£1=£50, the wager-derived RTP percentage would be £50/£1000, or 5%. The same analysis from the perspective of the EU side results in an MCP jackpot of 1000·6.25%·€ 1=€ 62.50, which is the equivalent in absolute monetary terms as £50. However, the amount of EU € which would be wagered over 1000 wagers would be € 1000, and the wager-derived RTP percentage for EU wagers would be 6.25%.

While it may be technically acceptable to provide an MCP using different RTPs for each currency, some operators wish to avoid significant changes in RTP since too high an RTP reduces or even eliminate the expected casino profit and too low an RTP can lead to such unsatisfying play experiences that some players will decide to never play that game again. Also, such MCPs whose average RTP changes over time may run afoul of national or regional wagering regulations and/or cause the activation of regulatory reporting procedures that a casino would prefer to avoid. A hyper-compliant approach to such regulations may involve ensuring that the long-term expected RTP percentage with respect to wagering contributions be the same between all currencies involved in the MCP. In some implementations, however, different RTPs across currencies may be acceptable, and the MCP jackpots implemented with different overall RTPs.

In the example thus far, there is no mechanism which allows each currency be set to desired levels as in the desired wager amount approach and contribute the same absolute monetary amounts to the MCP jackpot without having different overall RTP percentages for each currency, except in trivial cases, such as where the desired wager levels are set to amounts which are equivalent in absolute monetary terms or where the exchange rate is 1:1 between currencies.

The present inventor has discovered a method of remedying this issue through the use of one or more currency-specific seed amounts for the MCP jackpot (referred to herein as the "seeded approach"). This allows for an overall RTP to be set (124) which is not completely dependent on the wager-derived RTP; the overall RTP may be established before, or in conjunction with, the wager-derived RTP is set. For example, a different seed amount may be used for each currency, which allows fluctuations in the wager-derived RTP to be accounted for in each currency. The wager-derived RTP plus the seed RTP sum to produce the overall RTP.

To illustrate, the wager-based RTP for each currency (126, 128) for the MCP jackpot may be calculated as outlined above for a given MCP jackpot cycle. For example, if the wager-derived RTP for British £ is calculated to be 5%, the wager-derived RTP for EU € is calculated to be 6.25%, and the overall RTP is set to 9%, the seed RTP would be 9%−5%=4% for British £ and 9%−6.25%=2.75% for EU € (130). It may, however, only be necessary to repeatedly calculate the wager-based RTP for the secondary currency or currencies, as the wager-based RTP for the primary currency may remain static across all of the MCP jackpot cycles for that MCP.

In the implementation discussed above, for example, the British MCP jackpot may be funded using a £40 seed amount, and the Euro MCP jackpot may be funded using a € 27.50 seed amount. This results in the average British MCP winner receiving £50 (portion of MCP funded by wagering contributions from either currency)+£40 (portion of MCP funded by British seed amount)=£90, which equals a 9% overall RTP percentage. Similarly, this results in the average EU MCP winner receiving € 62.50 (portion of MCP funded by wagering contributions from either currency)+€ 27.50 (portion of MCP funded by EU seed amount)=€ 90, which also equals a 9% overall RTP percentage. Thus, the average overall RTP percentage for either EU or British players for each MCP jackpot is the same, the wagering amounts for each qualifying wager may be set as in the desired wager amount approach, and the odds of winning the MCP may be the same between the two currencies.

The present inventor has, however, realized a potential issue with the seeded approach. As shown in the example above, the particular seed amounts used are dependent on the exchange rates used to configure an MCP jackpot. Furthermore, because seed amounts are typically added during initialization for a given meter, the seed amount is usually the first thing a player sees on the meter after an MCP jackpot is won. Players may react adversely if the initial seed amount shown on the meter is different than expected. For example, seed values are typically selected to be round numbers, and players may come to expect such numbers to be shown on progressive jackpot meters when the meters are re-initialized following a progressive jackpot win. Furthermore, players who pay a particular progressive often grow used to seeing the same starting value for the progressive jackpot meter. A non-round seed value which fluctuates from MCP cycle to MCP cycle may cause many players to avoid playing the wagering games funding the MCP, especially if the new seed value is lower than the previous seed value.

There are several reasons for such negative player reactions. For example, some players have an expectancy that their wager contributions have "earned" the seed amount for the MCP. If the seed amount decreases from one MCP jackpot cycle to another in reaction to an exchange rate change, a player may feel that they are receiving less of their wager back than they should, i.e., not all of the portion of their wager which was to be applied to the MCP jackpot was actually applied to the MCP jackpot. In another example, players may simply be confused about a change in jackpot seed value, and be unnerved by it because they simply do not understand why it happened. Other players may incorrectly interpret shifting or oddly-valued seed amounts as an indication that equipment is not functioning correctly or is being manipulated by the gaming operator, even though this is not actually the case. Finally, some players may realize perfectly well that the shifting or oddly-valued seed amounts are the result of adjustments made due to currency fluctuations. Such players, however, may take umbrage at the fact that it is their currency which was adjusted rather than the other currency or currencies being adjusted relative to their currency, i.e., that their currency is viewed as "following" the other currency and is classified as the secondary currency in the MCP system. This feeling may be somewhat analogous to the resentment which people may feel towards having their national currency always being compared to a reserve currency.

The present inventor has also developed a solution which addresses such potential negative player perceptions. To avoid odd-valued or shifting initial seed amounts, only a portion of the seed amount for a currency may initially be transferred to the meter for the currency (132). The initial portion transferred may be selected to avoid odd values, and may be set to the same amount for each MCP cycle. Because players are only shown the meter amount, the players may always presented with a consistent and reassuringly "normal" seed value at the start of each MCP jackpot.

The remaining portion of the seed amount is held in escrow (134) and may then be transferred to the MCP jackpot over time (136). The escrowed amount may, for example, be held in memory, e.g., non-volatile memory, or a separate meter and may not be displayed to players. As the escrowed amount is transferred over to the corresponding currency meter over time, the players may indirectly become aware of the funds in the escrowed amount since the meter will grow, but it will be difficult for players to differentiate meter increases due to such transfers from meter increases due to player wager contributions. Such transfers may be referred to as "delayed seeding," and may be implemented in a variety of different ways.

In one implementation, delayed seeding may be implemented using a time-based rate, such as, for example, € 0.12/min. The rate chosen may be selected based on past game play, such as the rate of play for the last MCP cycle. For example, if the previous MCP cycle lasted 4.5 hours and the escrowed amount is initially € 5.65, the escrowed amount may be transferred over to the EU € meter at a rate of € 5.65/4.5 hours=€ 1.26/hour=€ 0.02/min. In some implementations, such a rate may be calculated by padding the rate to result in the complete transfer of the escrowed amount occurring earlier. For example, if the previous MCP cycle lasted 4.5 hours, the rate may be calculated assuming that the previous MCP cycle actually finished 1 hour earlier, i.e., the rate may be € 5.65/3.5 hours=€ 1.61/hour=€ 0.03/min.

In another implementation, the rate may be selected based on past game play over the past hour, day, or week. In other implementations, the rate may be selected based on past historical game play for the time of day, day of the week, or week of the year. Other implementations may calculate the rate based on a moving average of such data for previous time periods. Various other factors may be used to establish the rate as well, depending on the desire of the operator.

In some implementations, the rate of transfer may vary over time to account for natural variations in meter growth. For example, during off-peak hours, a meter may grow much more slowly than it does during peak hours due to decreased wagering activity. Players who are still wagering may become discouraged by the slow growth of the meter. To prevent such negative player perception, the escrowed amount may be transferred at a higher rate during off-peak hours and transferred at a lower rate during peak hours. In another implementation, an MCP system may be configured to vary the rate of transfer in response to actual meter growth, i.e., instead of relying on forecasts of meter growth during certain time periods, the MCP system may instead simply monitor the meters directly and increase or decrease the transfer in direct response to actual meter activity.

In another implementation, delayed seeding may be implemented on a try-by-try basis. A try is when a player initiates play of a game that could possibly award an MCP jackpot, e.g., a player who places a qualifying wager in an MCP-enabled wagering game would be considered to have initiated a "try." In such an implementation, each time a player makes a qualifying wager, the portion of the wager used to fund the MCP jackpot is transferred to the meter along with a portion of the escrowed amount. The amount transferred from the escrowed amount with each qualifying wager may be calculated in a variety of different ways. For example, one implementation may involve taking the initial escrowed amount and multiplying it by odds of winning the MCP jackpot. For example, if the escrowed amount is € 5.00 and the odds of winning the MCP jackpot are 1 in 500, the amount of the escrowed portion transferred with each wager may be € 5.00·1/500=€ 5.00·0.002=€ 0.01.

In another implementation, the rate of transfer may be set to a function of the seed amount still in escrow. For example, the amount of funds which are transferred per try in a try-by-try implementation might be determined according to the equation N=maximum (€ 0.01, floor (0.50%·$€_{escrow}$, € 0.01)). Such an implementation would transfer 0.50% of the seed amount, rounded down to the nearest € 0.01, still in escrow for each try, although at least € 0.01 would be transferred for each try. Such an implementation results in an escrow depletion curve which is initially non-linear and which becomes linear when the depletion rate hits € 0.01 per try.

Some or all of the secondary currency MCP jackpots in a particular MCP may be configured to utilize delayed seeding. In some implementations, the primary currency MCP jackpot may also be configured to utilize delayed seeding as well. In other implementations, the entire primary currency seed amount may be used to initialize the primary currency meter and none of the primary currency seed amount may be placed into escrow.

One side effect of using delayed seeding is that it may be possible for a player using a particular MCP currency to win the MCP jackpot in that currency before the escrowed amount associated with the meter for that currency has been completely transferred to that currency meter. The most extreme case would be when a player wins the MCP at the earliest opportunity after the MCP is initialized or re-initialized. In such a case, all, or nearly all, of the escrowed amount may still be in escrow and little, if any, would have been transferred to the meter. Various implementations may address this situation in various ways. In one implementation, the remaining escrowed amount is transferred over to the meter as a lump sum, or is added directly to the player's account without being transferred to the meter. In either case, the player receives the remaining amount in escrow. In another implementation which may be implemented in some gaming jurisdictions depending on the relevant applicable gaming regulations, the remaining escrowed amount may be carried forward to the next MCP cycle and added to the usual delayed seed amount. If the escrow transfer rate is typically calculated under conditions which target complete exhaustion of the escrowed amount at approximately the same time as average MCP jackpot is won, the carried-forward amount may later be cancelled out by a player who wins the MCP jackpot later than expected.

In some alternate implementations in accordance with some gaming jurisdiction regulations, the remaining escrowed amount may be transferred to the seed amount for the next MCP jackpot cycle. In some scenarios, the remaining escrowed amount may be used to fund the seed amount, although the seed amount remains unchanged. For example, if the seed amount for the current MCP jackpot cycle is € 9.70, and the remaining escrowed amount from the previous MCP jackpot cycle is € 9.63, then the system in this variation would add € 0.07 to the remaining value of € 9.63 to yield a seed amount of € 9.70 for the next jackpot cycle. Some jurisdictions may treat this as the equivalent of crediting the remaining escrowed amount back to the operator since it reduces the amount of new funding which the operator would need to contribute to fund the seed amount for the current MCP jackpot cycle.

In some other scenarios, the remaining escrowed amount may be added to the seed amount for the next jackpot cycle, effectively increasing the seed amount (and resulting RTP) for that jackpot cycle. For example, if the seed amount is € 9.70, and the remaining escrowed amount for the previous MCP jackpot cycle is € 9.63, then the system in this variation may add € 9.63 to the to the seed amount of € 9.70 to yield a total value of € 19.33 for the current MCP jackpot cycle.

In either case, a portion of the seed amount may be initially transferred to the credit meter as outlined above, and the remaining portion of the seed amount held in escrow. In some implementations, the remaining escrowed amount may simply stay in the escrow and the remaining portion of the seed amount may augment it.

In situations where the seed amount for an MCP jackpot cycle is actually increased due to carryover of a remaining escrowed amount, the delayed seeding technique used may be modified to account for the increased escrow size. For example, the delayed seeding transfer rate may be increased such that, assuming that the MCP jackpot cycle is an average-length cycle, the increased seed amount will be completely transferred by the same point in time as the non-increased seed amount would have been transferred absent the remaining escrowed amount. The rate may be modified by either increasing the amount of currency in each transfer or by increasing the frequency of transfers. In other implementations, the rate of funding remains unchanged but occurs over a greater period of time.

In yet another implementation, which may be implemented in accord with gaming regulations in some gaming jurisdictions, the remaining escrowed amount may be credited back to the gaming operator. While some jurisdictions may not allow such back-crediting to occur, other jurisdictions may allow it since, technically, the delayed seed amount is not funded directly from player wagers, but is instead offered up by, for example, a gaming operator as a marketing expense.

Another side effect of using delayed seeding is that it may be possible for the escrowed amount associated with the meter for a particular currency to be completely transferred to that meter before the MCP jackpot is won during an MCP cycle. Various implementations may address this situation in various ways.

In one implementation, when the escrowed portion for a currency in an MCP cycle is exhausted, all further delayed seeding for that currency ends for that cycle. The meter for that currency, however, continues to be increased based on contributions received from qualifying wagers. In a try-by-try implementation such as that discussed above, i.e., a € 5.65 delayed seed/escrowed amount and odds of winning the MCP jackpot of 1 in 500, the contributions from the first 500 wagers may be matched by 500 corresponding € 0.01 escrowed amount transfers. After the $500^{th}$ wager, there may be no further transfers from the escrowed amount (which is now zero). Some jurisdictions may treat try-by-try transfers as a form of wager, however, which may limit the gaming operator's ability to cease such transfers mid-cycle.

In another implementation, the seed amount continues to be augmented by further transfers even after the escrowed amount is exhausted. In such implementations, the gaming operator may need to provide additional funds to cover the extra transfers.

It is to be understood that the currency meters discussed herein may indicate meter values which represent, for each currency meter, a combination of two different amounts. For every currency meter, one portion of the amount indicated will be the absolute monetary equivalent of the total wager contributions received from all participating wagers in the current MCP jackpot cycle. This amount is the same, in absolute monetary terms, across all of the currency meters. Each currency meter for an MCP jackpot will also, in addition to the wager-derived amount, include the seed amount for the corresponding currency which has been transferred to the currency meter. The seed amounts between currency meters may have different absolute monetary values, and the overall amounts indicated by the currency meters may therefore differ in absolute monetary terms despite including the same absolute monetary amounts due to wager contributions. It is to be further understood that all of the currencies participating in a given MCP jackpot cycle are eligible to win the MCP jackpot, and that the win of the MCP jackpot by any one currency resets the MCP jackpot for all of the participating currencies.

An MCP may also be implemented to allow for different bet levels within one or more of the currencies it supports. One such MCP implementation is provided in the following example implementation of an MCP (hereinafter "multi-level MCP"), in which wagering in both British pounds (£) and European Union (EU) euros (€ ) is supported. In the multi-level MCP example, it is again assumed that the relevant exchange rate for British £ to EU € is 1 to 1.25. In the multi-level MCP example, wagering machines allowing wagering in EU € may support wagers of 1, € 2, and € 3, although only € 2 and € 3 wagers may be qualifying wagers. For the purposes of the multi-level MCP example, wagering games allowing wagering in British £ may only support qualifying wagers of £1.

In the multi-level MCP example, the MCP may have odds of winning of 1 in 1000 qualifying unit wagers. It is possible to set each qualifying unit wager for each currency independently. For example, the qualifying unit wager for British £ may be £1, whereas the qualifying unit wager for EU € may be € 2. The MCP may be further implemented such that 5% of each British £ wager is used to fund the MCP jackpot. Thus, 5 pence of each £1 British wager will be used to fund the MCP jackpot.

For an MCP, it may be desirable to have the odds for qualifying unit wagers in all currencies be the same. It may also be desirable to have such odds tied to the absolute monetary value of the wager contribution of each qualifying unit wager. If one takes into account these principles and applies them to the EU wagers for the MCP in the multi-level MCP example, the following may be observed.

First, in order for a given EU qualifying unit wager in the multi-level MCP example to have the same odds of winning the MCP jackpot as a British qualifying unit wager, the EU qualifying unit wager must contribute an amount with the same absolute monetary value as the 5 pence which is contributed by the £1 British qualifying unit wager, i.e., under the exchange rate above, 6.25 eurocents of each qualifying unit wager in EU € would need to be used to fund the MCP jackpot. Each EU qualifying unit wager of € 2 would thus need to contribute 6.25 eurocents to the MCP. Since a € 3 EU qualifying wager is 1.5 times as large as the € 2 qualifying unit wager, the € 3 EU wager would contribute 9.375 eurocents per wager, and would have a corresponding 50% higher chance of winning the MCP jackpot than either a € 2 EU wager or a £1 British wager.

Second, the RTP for the multi-level MCP example is calculated in much the same way as in other, non-multi-level MCP implementations. In this example, an MCP jackpot is expected to be won, on average, once for every 1000 qualifying unit wagers made. For the British £ MCP jackpot, this results in a wager-based RTP of £50/(£1·1000)=0.05=5%. For the EU € MCP jackpot, this results in a wager-based RTP of € 62.50/(€ 2·1000)=0.03125=3.125%.

Additionally, a seed amount or seed RTP is selected for one of the currencies, in this case, British £. For example, a seed amount of £40 may be selected. For the British £ MCP jackpot, the overall RTP is then equal to the average jackpot award, i.e., £50 (wagering contributions)+£40 (seed amount)= £90, divided by the average total wagers in British £ needed to win the MCP jackpot, i.e., £1000, which results in an overall RTP of 9%.

Finally the seed amount for the remaining currency, e.g., EU € , may be selected to result in an overall RTP for the remaining currency which is equal to the overall RTP for the primary currency, e.g., British £. For example, if the overall RTP of the British £ MCP jackpot is 9%, and the wager-based RTP for the EU € MCP jackpot is 3.125%, then the seed RTP for the EU € MCP jackpot will need to be 9%−3.125%=5.875%, which results in a seed amount of 5.785%·€ 2000=0.05875·€ 2000=€ 117.50.

As discussed above, a portion of the EU € seed amount may be transferred to the EU € meter, and the remaining portion of the EU € seed amount may be placed into escrow and gradually added to the EU € meter over time via delayed seeding, such as is described earlier in this paper. In some implementations which utilize the try-by-try delayed seeding approach, the amounts which are transferred from escrow for each try may be adjusted to match the bet level of the try. For example, if the escrowed amount is € 77.50 and the odds per qualifying unit wager are 1 in 1000, the amount transferred per qualifying unit wager, e.g., € 2 in this case, would be € 77.50/1000=€ 0.0775. However, if a player made a wager other than the qualifying unit wager, the amount transferred would be multiplied by the amount of the wager made divided by the qualifying unit wager, e.g., € 3/€ 2=1.5. Thus, for a € 3 wager/try in the present example, € 0.11625 would be transferred to the EU € meter.

When an MCP jackpot is won, i.e., a qualifying wager triggers the MCP jackpot win condition (138), all of the meters for all of the participating currencies are reset and re-initialized, assuming that further MCPs are to be conducted using that MCP implementation (140). The winner is paid at least the jackpot amount shown, prior to reset, on the meter for the currency which was used to place the winning wager. In some MCP implementations there may be one or more additional escrows associated with a given meter which may used for purposes other than accommodating multiple currencies, such as increasing meter activity during off-peak hours, and/or improving visible meter behavior in distributed systems. In many jurisdictions, the value in these additional escrows may be added to the value shown by the jackpot meter, increasing the player's final award. In some implementations, an award amount to be paid to a player may be transferred to the player over an established period of time, such as in yearly payments for a specified number of years. In such implementations, the player may request a lump-sum monetary equivalent of this payment stream be paid in lieu of the payment stream itself. In some implementations, the player may request that the jackpot be paid out in another currency, but if this is done, the amount paid out will have an absolute monetary value equivalent to the jackpot amount shown on the meter for the currency which was used to place the winning wager. If no further MCP jackpots are to be offered in that MCP implementation, the implementation ends (142).

Figure 2:
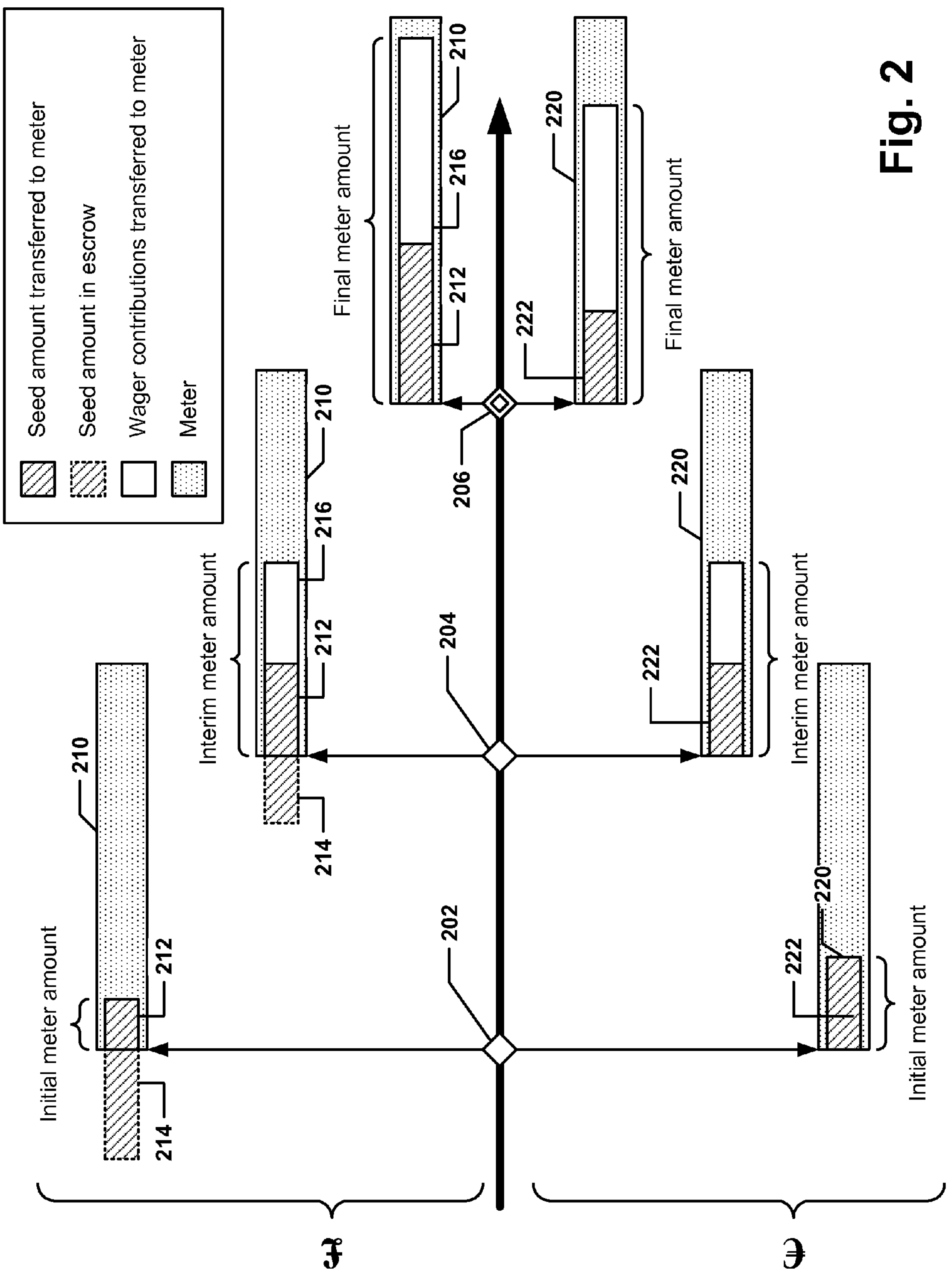
FIG. 2 depicts a high-level diagram showing various meter values according to one example implementation.

FIG. 2 shows a conceptual diagram showing several potential, high-level states for one implementation of a two-currency (British £ and EU € ) MCP jackpot over one jackpot cycle. To aid in understanding, monetary amounts (meter seed amount, escrow seed amount, and wager contributions) are shown in terms of rectangles in which the size of each rectangle represents the relative size of the absolute monetary value of the amounts. At 202, the MCP jackpot cycle begins, and both the British and EU MCP jackpots have been assigned seed amounts. For the British MCP jackpot, a portion of the seed amount 212 has been transferred to meter 210, and the remainder of the seed amount 214 has been placed into escrow. For the EU MCP jackpot, the entire seed amount 222 has been transferred to meter 220, and none of the seed amount has been placed into escrow. Initially, the British meter has a lower absolute monetary value than the EU meter.

At 204, a number of wager contributions have been received, and both meter 210 and meter 220 now reflect the same amount of overall wager contributions 216. Seed amount 222 remains the same as it was at the start of the cycle, although seed amount 212 has grown due to transfers of portions of remainder 214 from escrow. Remainder 214 has, likewise, shrunk by a corresponding amount due to the transfers.

At 206, a winner has won the jackpot and, depending on which currency the winner was using, the amount shown in the appropriate currency meter will be paid to the winner. 206 represents the end of the jackpot cycle. Again, both meter 210 and meter 220 reflect the same overall wager contributions 216. As with 202 and 204, seed amount 222 in meter 220 remains unchanged, although the entire remainder 214 has been transferred from escrow to seed amount 212 in meter 210. Thus, at the end of this example jackpot cycle, the absolute monetary value of the British £ jackpot is greater than the absolute monetary value of the EU € jackpot. This is, of course, only one example, and other implementations of an MCP may exhibit different behavior depending on the parameters chosen and the exchange rates used.

In practice, the seed amounts for each MCP jackpot cycle may be calculated anew at the start, or before the start, of each MCP jackpot cycle. Such recalculation allows for the seed amounts to be adjusted taking into account currency exchange variations.

For example, consider a three-currency MCP in which US $, British £, and EU € are supported. For the purposes of this example (hereinafter "three-currency example"), the absolute monetary value of each currency is calculated with respect to the US $, although other implementations may involve calculating absolute monetary values with respect to one of the other two currencies, or with respect to a another currency not in the example. A total of three MCP jackpot cycles are discussed, although similar procedures may be followed for as many follow-on MCP jackpot cycles as are desired.

In the three-currency example, the MCP may be implemented to have average odds of winning of 1 in 1000 qualifying unit wagers. The qualifying wager for each currency may be one unit currency amount, i.e., $1, £1, or € 1. In the first MCP jackpot cycle, the relevant exchange rates may be $1: £0.50: € 0.75. In this example implementation, US $ are treated as the baseline or primary currency, and the wager contribution from US $ wagers may be defined to be 5%, although this contribution could be expressed differently, such as simply a monetary amount. The British £ and EU € are, in this implementation, treated as the secondary currencies. In this implementation, the portions of the wagers in all three currencies which are contributed to the MCP jackpot are configured to have the same absolute monetary value. Thus, wagers of $1, £1, or € 1 will result in $0.05, £0.025, or € 0.0375 contributions to the first MCP jackpot, respectively. The wager-derived RTPs for US $, British £, or EU € are 5%, 2.5%, and 3.75%, respectively. A seed amount of $40 may be selected for the US $ MCP jackpot, which yields a seed RTP for the US $ MCP jackpot of 4% and an overall RTP for the US $ MCP jackpot of 5%+4%=9%. Such a seed amount may be selected to allow for the vast majority of potential exchange rate combinations, i.e., the overall RTP values for all of the participating currencies may be kept equal over a selected range of different potential exchange rates and/or selected so as to maintain or increase player interest in the MCP. The US $ seed amount may be kept constant from cycle to cycle. Accordingly, for the first MCP jackpot cycle, the seed RTPs for British £ and EU € are 9%−2.5%=6.5% and 9%−3.75%=5.25%, respectively, and the corresponding seed amounts are £65 and € 52.50, respectively. In this example implementation, the entire $40 seed amount may be used to initialize the US $ meter, although only £40 and € 40 of the £65 and € 52.50 seed amounts may be used to initialize the British £ and EU € meters, respectively. The remaining £25 and € 12.50 seed amounts may be placed into escrows associated with the British £ and EU € meters, respectively, and transferred to those meters over time via a delayed seeding mechanism.

In the second MCP jackpot cycle, the relevant exchange rates have changed to $1:£0.40: € 0.65. Thus, wagers of $1, £1, and € 1 will result in $0.05, £0.02, and € 0.0325 contributions to the second cycle MCP jackpot, respectively. The wager-derived RTPs for US $, British £, and EU € are 5%, 2%, and 3.25%, respectively. Thus, the seed RTPs for US $, British £, and EU € are 4%, 7%, and 5.75%, respectively, and the seed amounts are $40, £70, and € 57.50, respectively. The same initial meter amounts as used for the first MCP jackpot cycle, i.e., $40, £40, and € 40, may be used again to initialize the three different currency meters, which provides players with a consistent and reassuring initial meter value in every currency. Due to the change in seed amount for British £ and EU €, £30 and € 7.50 may be transferred into escrows associated with the corresponding meters for those currencies and transferred to those meters over time via a delayed seeding mechanism.

In the third MCP jackpot cycle, the relevant exchange rates have changed to $1:£0.60: € 0.80. Thus, wagers of $1, £1, and € 1 will result in $0.05, £0.03, and € 0.04 contributions to the third cycle MCP jackpot, respectively. The wager-derived RTPs for US $, British £, and EU € are 5%, 3%, and 4%, respectively. Thus, the seed RTPs for US $, British £, and EU € are 4%, 6%, and 5%, respectively, and the seed amounts are $40, £60, and € 50, respectively. The same initial meter amounts as used for the first and second MCP jackpot cycles, i.e., $40, £40, and € 40, may be used once again to initialize the three different currency meters, which again provides players with a consistent and reassuring initial meter value in every currency. Due to the change in seed amount for British £ and EU €, £20 and € 10 may be transferred into escrows associated with the corresponding meters for those currencies and transferred to those meters over time via a delayed seeding mechanism.

While the three-currency example features a fixed seed amount of $40 for the US $ MCP jackpot which is initially credited in its entirety to the US $ meter, other implementations may feature, for example, a zero seed amount for one of the currencies used in the MCP jackpot. In yet other MCP implementations, there may be seed amounts for all currencies participating in an MCP jackpot, and for each and every such seed amount, a portion of the seed amount may be transferred to the meter for that seed amount's currency. In the context of the three-currency example discussed above, for example, only $20 of the $40 US $ seed amount may be transferred to the US $ meter initially, and the remaining $20 may be transferred over time via delayed seeding.

Implementations of the MCP system may be automated so that, for each MCP jackpot cycle, the seed amounts are automatically recalculated without further operator input or interaction using the most relevant currency exchange rates for the given MCP cycle. The MCP system may obtain such rates, for example, from a server which tracks international exchange rates. The MCP system may modify those rates, if desired, in accord with gaming operator-formulated rules. For example, exchange rates often reflect a built-in transaction fee. A gaming operator who deals with large transactions may, however, be able to negotiate a lower transaction fee with an exchange dealer, and may therefore wish to incorporate additional rules to govern such modifications to publicly-reported exchange rates. The MCP system may also be configured to select the appropriate exchange rate data with respect to the time at which an MCP jackpot is configured. For example, the operator may use the exchange rate in effect at the start of a month for any MCP jackpot which is configured within that month. An alternative implementation of the MCP system may utilize the instantaneous Interbank rate for the day on which an MCP jackpot is configured. Yet another implementation may change the exchange rate only on a quarterly or yearly basis. Yet other implementations may only change the exchange rate used in configuring an MCP jackpot if market exchange rates change by more than a predetermined percentage, such as 5% or 10%, with respect to the exchange rate currently used to configure MCP jackpots, or with respect to market rates over a predetermined period of time, such as over a week.

Implementations of the MCP system which are automated may require certain parameters to be established in order to ensure that automated handling of MCP jackpots is performed correctly. For example, with respect to all jackpots for a particular MCP, the system may require that an initial meter amount be specified for a given currency meter of the MCP jackpots, e.g., € 20 may be specified as the initial meter amount for the EU € meter. Another example may, for example, be rules which govern which exchange rate is to be used, as outlined above.

With respect to any particular jackpot in an MCP, a number of other variables may be required. For example, the currency exchange rate may be required and may, for example, be supplied by a server which monitors global financial databases for currency exchange information. In some implementations, there may be funds which are carried over from a previous jackpot and into the current jackpot—for example, if there is seed amount still in escrow when an MCP jackpot is won, the remaining seed amount in escrow may be transferred to the seed amount for the following MCP jackpot. Data indicating such funds may be required to help determine the amount of additional funds, if any, that will need to be transferred to the seed amount to augment the carryover and reach the desired seed amount. A secondary currency feed rate for delayed seeding may also need to be specified so that the MCP system may transfer an escrowed seed amount to the appropriate meter at a rate which is compatible with the average MCP jackpot win interval. In some implementations, a different secondary feed rate may be specified for each secondary currency. An overall RTP target, or information which allows calculation of an overall RTP target, such as a primary currency RTP and seed RTP, may be required.

Additional parameters may need to be specified to cover situations in which an "out-of-bounds conversion" occurs. Out-of-bounds conversion may occur when an MCP jackpot RTP for a given currency exceeds the target jackpot RTP even if none of the seed amount for that currency is placed into escrow, i.e., the entire seed amount is initially placed in the currency meter. Such scenarios may largely be avoided through careful selection of the overall RTP with respect to the wagering amounts and expected contributions from each currency to the MCP jackpot, but large-scale, unexpected exchange rate fluctuations may invalidate the assumptions made in establishing the MCP parameters, which may require that an out-of-bounds conversion process be implemented.

For example, one method of dealing with an out-of-bounds conversion is to simply allow the average overall RTP to exceed the target overall RTP. This may result in the gaming operator having to contribute additional funds/reap less profit, but such treatment is unlikely to concern many regulatory agencies, as the players will end up benefiting from such an increase.

In another example, the initial seed amount used to initialize the meter for a given currency may be changed. This may be detected by players, and may cause some puzzlement on their behalf. For example, if the initial seed amount shown on an EU € meter is typically € 3.50, but the calculated EU € seed amount is € 3.38, the initial seed amount may be adjusted downwards to € 3.00, which allows € 0.38 to be placed into escrow. The players, however, may notice that the initial seed amount on the currency meter has dropped by € 0.50.

In another implementation of out-of-bounds conversion, the initial seed amount used to initialize the meter may simply be the current seed amount. For example, instead of reducing the initial seed amount by “round” or “normal” values, such as € 0.50 or € 1, the initial seed amount may simply be reduced until it equals the calculated total seed amount. In the example where the calculated total seed amount is € 3.38, the initial seed amount of € 3.50 would be reduced by € 0.12.

A further implementation for handling out-of-bounds conversion may involve a reverse escrow in which the initial seed amount shown on the meter is kept at the usual value, but portions of each wager contribution are redirected from the meter to the escrow or the operator until the overall RTP is at the desired level.

Finally, a gaming operator may also specify that an MCP jackpot for a currency which is generating an “out-of-bounds” condition be disqualified from participating in the MCP until the exchange rates have shifted sufficiently to stop causing the out-of-bounds condition.

Implementations of an MCP system may also be configured to evaluate and respond to fluctuations in currency rates while an MCP jackpot cycle is in progress. For example, if an operator wishes to utilize the exchange rate at the start of each calendar month, and a particular MCP jackpot cycle crosses from one month to the next, the currency exchange rate change could be taken into consideration by the system. For example, assume that the Euro equivalent of a £0.0800 British wager contribution increases from € 0.08920 to € 0.09668. An MCP system may be configured to increase the portion of each EU € wager from € 0.08920 to € 0.09668 for every subsequent GBP bet.

Some implementations of an MCP system may be configured to adjust subsequent rates in order to make the total growth in the secondary currency MCP jackpot closer to the current monetary value of the primary MCP jackpot growth. For example, if the current EU € growth is too low relative to a re-evaluation of the corresponding British £ growth, a higher-than-actual exchange rate could be used to try to close the gap by some period of time. For business and regulatory reasons, such an implementation may be uncommon, although such implementations are considered to be within the scope of this disclosure.

A further example is given to provide further context and understanding. In this example, a British £ SCP is established with a £2 qualifying unit wager, jackpot odds of 1 in 1000, a £100 seed amount, and a 4% wager contribution, i.e., £0.08 of each £2 qualifying wager is contributed to the SCP jackpot. The overall RTP for the British £ SCP jackpot is 4% (wager-derived RTP)+5% (seed RTP, calculated by £100/(1000·£2)=5%). Thus, after one hundred £2 wagers have been made, the SCP jackpot will have grown by 100·£0.08=£8, and the meter for the SCP will reflect £100 (seed amount)+£8 (wager contributions)=£108. If the SCP were to produce a jackpot winner in the 1111$^{th}$ play (111 more plays than expected according to the odds of winning discussed above), the total SCP jackpot would be £188.88.

It may then be desired to link an EU € SCP jackpot which uses qualifying unit wagers of € 2 to the British £ SCP jackpot to form a two-currency MCP with British £ as the primary currency and EU € as the secondary currency. In this implementation, the EU odds of winning per qualifying unit wager must be the same as the British odds for winning, i.e., 1 in 1000, and the absolute monetary value of each contribution from an EU qualifying unit wager must be equal to the absolute monetary value of contributions from British qualifying unit wagers. For the initial MCP jackpot cycle, the exchange rate of £ to € may be £1 to € 1.115. According to this exchange rate, each € 1 wager must contribute £0.08·€ 1.115/£1=€ 0.0892.

Thus, for each wager made, regardless of whether it is a British £ or an EU € wager, the meters for the two currencies each grow by £0.08 and € 0.0892, respectively. Thus, the EU € meter may, after 100 wagers, be increased by € 0.0892·100=€ 8.92, which may be added to the EU € seed for the EU meter. As discussed previously, the secondary currency seed amount may be selected to produce similar or identical overall jackpot RTPs between the participating currencies in the MCP. In this case, the secondary seed amount, i.e., EU € seed amount, may be selected such that the EU € MCP jackpot has an overall RTP equal to the overall RTP for the British £ MCP jackpot, i.e., 9%. The wager-derived RTP for EU € may be calculated as outlined earlier in this document. An alternate method of calculating the RTP which provides equivalent results is to simply divide the individual wager contribution for a currency by the qualifying unit wager for that currency. In this case, the EU € contribution per € 2 wager is € 0.0892, so the EU € wager-derived RTP is € 0.0892/2=4.46%. Thus, the seed RTP for the EU € MCP jackpot would be 9%−4.46%=4.54%, which results in an EU € seed amount of 1000·€ 2·4.54%=€ 90.80.

If this example MCP were to be implemented without any delayed seed mechanism, the total jackpot displayed on each currency meter and the jackpot growth for each currency would be as shown in Table 1 below.

TABLE 1

| | £ | | EUR | |
|---|---|---|---|---|
| | Total Jackpot Displayed | Jackpot Growth | Total Jackpot Displayed | Jackpot Growth |
| MCP Jackpot Start | £100.00 | £0.00 | €90.80 | €0.00 |
| 100th Play | £108.00 | £8.00 | €99.72 | €8.92 |
| 200th Play | £116.00 | £16.00 | €108.64 | €17.84 |
| 300th Play | £124.00 | £24.00 | €117.56 | €26.76 |
| . . . | . . . | . . . | . . . | . . . |
| 1000th Play | £180.00 | £80.00 | €180.00 | €89.20 |
| 1100th Play | £188.00 | £88.00 | €188.92 | €98.12 |
| 1111th Play | £188.88 | £88.88 | €189.90 | €99.10 |

It is to be understood that, for this particular example, the jackpot is actually won on the 1111$^{th}$ play, which is 111 wagers more than would be expected on average. Thus, the actual RTP for this particular would be slightly lower than expected.

After the jackpot is won on the 1111$^{th}$ play, the currency meters in this example are both reset to begin a new MCP jackpot cycle. The £ meter is reset to the £100 amount again, but the € meter may be reset to a different amount to account for any fluctuations in exchange rates. For example, if the exchange rate of £ to € is now £1 to € 1.2085, the required € contribution from each qualifying € wager would be £0.08·€ 1.2085/£1=€ 0.09668, which results in a wager-derived RTP of 4.834%, a seed RTP of 4.166%, and a seed amount of € 83.32. Accordingly, the total jackpot displayed on each currency meter and the jackpot growth for each currency for the second MCP jackpot cycle would be as shown in Table 2 below.

TABLE 2

| | GBP | | EUR | |
|---|---|---|---|---|
| | Total Jackpot Displayed | Jackpot Growth | Total Jackpot Displayed | Jackpot Growth |
| MCP Jackpot Start | £100.00 | £0.00 | €83.32 | €0.00 |
| 100th Play | £108.00 | £8.00 | €92.99 | €9.67 |
| 200th Play | £116.00 | £16.00 | €102.66 | €19.34 |
| 300th Play | £124.00 | £24.00 | €112.32 | €29.00 |
| ... | ... | ... | ... | ... |
| 1000th Play | £180.00 | £80.00 | €180.00 | €96.68 |
| 1100th Play | £188.00 | £88.00 | €189.67 | €106.35 |

As is evident from the tables above, the second cycle features a much lower seed value for EU € than the first cycle did, but also features a faster growth rate, i.e., a greater percentage of each € 2 wager is contributed to the MCP jackpot. Correspondingly, the EU € meter shows a smaller number than the British £ meter shows at the start of the jackpot cycle, but a greater number than the British £ meter shows at the end of the jackpot cycle, which occurs at the 1100$^{th}$ bet in the second cycle.

As discussed previously in this paper, it may be desirable to mask the fluctuating nature of the secondary currency seed amounts from players. To that end, a delayed seeding mechanism may be implemented as outlined previously in this paper.

For example, a delayed seeding mechanism could be implemented for the EU € currency meter. The initial meter amount for the EU € meter could be set to be € 50, and the escrow feed rate could be set to € 0.10/qualifying wager. Table 3 shows the total jackpot displayed and the jackpot growth for British £ for every 100th qualifying wager. Table 3 also shows the total jackpot displayed, the wager-derived jackpot growth, the seed-derived jackpot growth, and the seed amount remaining in escrow for EU € for every 100$^{th}$ qualifying wager. For comparison, Table 3 also includes similar data for the seeded EU € jackpot without delayed seeding, i.e., the entire seed amount is used to initialize the EU € meter. As can be seen, due to the feed rate selected, by the time the 500$^{th}$ wager has occurred (to be exact, by the 408$^{th}$ wager), the total jackpot displayed using either the delayed seed or non-delayed seed implementation of the EU € MCP jackpot is the same and remains the same until the MCP jackpot is won. In this example, the MCP jackpot is configured to cease delayed seeding when the escrowed seed amount is used up—however, in implementations where the seed rate is maintained despite the exhaustion of the escrowed seed amount, the total jackpot displayed will diverge.

TABLE 3

| | £ | | EUR | | | | EUR (No Delayed Seed) | |
|---|---|---|---|---|---|---|---|---|
| | Total Jackpot Displayed | Jackpot Growth | Total Jackpot Displayed | Wager-Derived Jackpot Growth | Seed-Derived Jackpot Growth | Seed Escrow Remaining | Total Jackpot Displayed | Jackpot Growth |
| MCP Jackpot Start | £100.00 | £0.00 | €50.00 | €0.00 | €0.00 | €40.80 | €90.80 | €0.00 |
| 100th Play | £108.00 | £8.00 | €68.92 | €8.92 | €10.00 | €30.80 | €99.72 | €8.92 |
| 200th Play | £116.00 | £16.00 | €87.84 | €17.84 | €20.00 | €20.80 | €108.64 | €17.84 |
| 300th Play | £124.00 | £24.00 | €106.76 | €26.76 | €30.00 | €10.80 | €117.56 | €26.76 |
| 400th Play | £132.00 | £32.00 | €125.68 | €35.68 | €40.00 | €0.80 | €126.48 | €35.68 |
| 500th Play | £140.00 | £40.00 | €135.40 | €44.60 | €40.80 | €0.00 | €135.40 | €44.60 |
| 600th Play | £148.00 | £48.00 | €144.32 | €53.52 | €40.80 | €0.00 | €144.32 | €53.52 |
| 700th Play | £156.00 | £56.00 | €153.24 | €62.44 | €40.80 | €0.00 | €153.24 | €62.44 |
| 800th Play | £164.00 | £64.00 | €162.16 | €71.36 | €40.80 | €0.00 | €162.16 | €71.36 |
| 900th Play | £172.00 | £72.00 | €171.08 | €80.28 | €40.80 | €0.00 | €171.08 | €80.28 |
| 1000th Play | £180.00 | £80.00 | €180.00 | €89.20 | €40.80 | €0.00 | €180.00 | €89.20 |
| 1100th Play | £188.00 | £88.00 | €188.92 | €98.12 | €40.80 | €0.00 | €188.92 | €98.12 |
| 1200th Play | £196.00 | £96.00 | €197.84 | €107.04 | €40.80 | €0.00 | €197.84 | €107.04 |

Table 4 provides similar data as that shown in Table 3, but with respect to the second MCP jackpot cycle. In the second MCP jackpot cycle, the total jackpot displayed for the EU € meter is the same regardless of whether or not delayed seeding is used after the 333rd wager is made.

TABLE 4

| | GBP | | EUR | | | | EUR (No Delayed Seed) | |
|---|---|---|---|---|---|---|---|---|
| | Total Jackpot Displayed | Jackpot Growth | Total Jackpot Displayed | Wager-Derived Jackpot Growth | Seed-Derived Jackpot Growth | Seed Escrow Remaining | Total Jackpot Displayed | Jackpot Growth |
| MCP Jackpot Start | £100.00 | £0.00 | €50.00 | €0.00 | €0.00 | €33.32 | €83.32 | €0.00 |
| 100th Play | £108.00 | £8.00 | €69.67 | €9.67 | €10.00 | €23.32 | €92.99 | €9.67 |
| 200th Play | £116.00 | £16.00 | €89.34 | €19.34 | €20.00 | €13.32 | €102.66 | €19.34 |
| 300th Play | £124.00 | £24.00 | €109.00 | €29.00 | €30.00 | €3.32 | €112.32 | €29.00 |
| 400th Play | £132.00 | £32.00 | €121.99 | €38.67 | €33.32 | €0.00 | €121.99 | €38.67 |
| 500th Play | £140.00 | £40.00 | €131.66 | €48.34 | €33.32 | €0.00 | €131.66 | €48.34 |
| 600th Play | £148.00 | £48.00 | €141.33 | €58.01 | €33.32 | €0.00 | €141.33 | €58.01 |
| 700th Play | £156.00 | £56.00 | €151.00 | €67.68 | €33.32 | €0.00 | €151.00 | €67.68 |
| 800th Play | £164.00 | £64.00 | €160.66 | €77.34 | €33.32 | €0.00 | €160.66 | €77.34 |
| 900th Play | £172.00 | £72.00 | €170.33 | €87.01 | €33.32 | €0.00 | €170.33 | €87.01 |
| 1000th Play | £180.00 | £80.00 | €180.00 | €96.68 | €33.32 | €0.00 | €180.00 | €96.68 |
| 1100th Play | £188.00 | £88.00 | €189.67 | €106.35 | €33.32 | €0.00 | €189.67 | €106.35 |
| 1200th Play | £196.00 | £96.00 | €199.34 | €116.02 | €33.32 | €0.00 | €199.34 | €116.02 |

Figure 3:
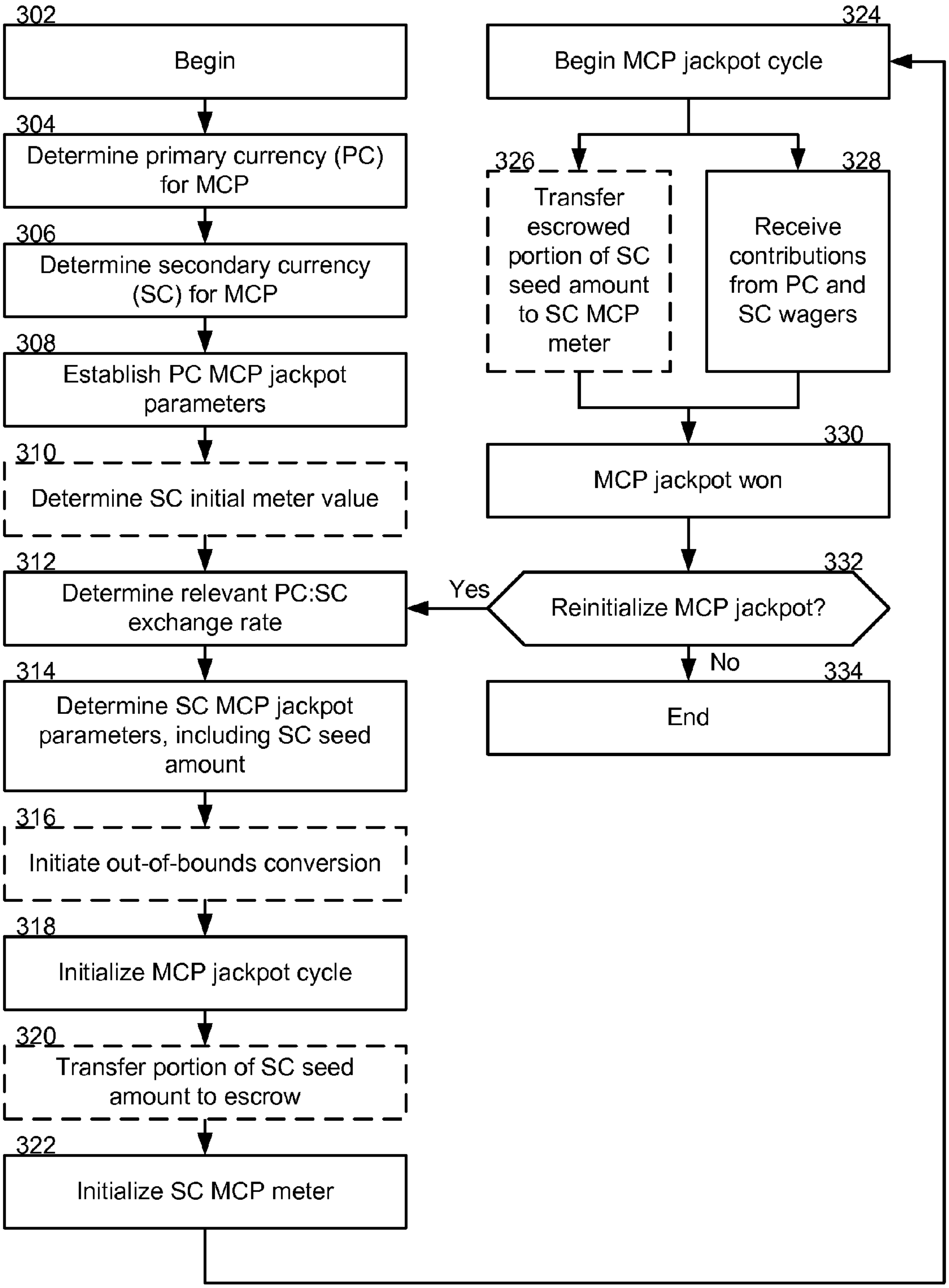
FIG. 3 depicts a high-level flow diagram for another technique outlined in this disclosure.

At a high level, with reference to FIG. 3, one implementation of an MCP may start (302) and a primary currency may be designated (304). One or more secondary currencies may also be designated (306). Various parameters needed to provide the primary currency MCP jackpot may be established (308) according to the business needs of the MCP operator. For example, the MCP operator may configure the primary currency MCP jackpot with certain odds and an overall RTP which are selected to entice players to participate in the MCP.

In 310, a secondary currency initial currency meter value may be determined. As noted above, this amount may be selected to allow for a delayed seeding mechanism to be used. In implementations where delayed seeding is not used, determining the secondary currency initial currency meter value may be optional.

For each MCP jackpot cycle, the relevant primary currency to secondary currency exchange rate may be determined (312). Various techniques may be used to arrive at the relevant exchange rate, as discussed earlier in this paper. After the relevant exchange rate is determined, various secondary currency MCP jackpot parameters may be determined according to the relevant exchange rate of 312 and the parameters selected for the primary currency MCP jackpot in 308, as discussed at length earlier in this paper. Such secondary currency MCP jackpot parameters may include, for example, the contribution per secondary currency qualifying unit wager to the MCP jackpot and the secondary seed amount.

If out-of-bounds conversion functionality is included in the implementation and the determined secondary currency MCP jackpot parameters result in an out-of-bounds scenario, the out-of-bounds conversion functionality may be initiated, such as, for example, is described in paragraphs [0123]-[0128] of this paper. Such initiation may be optional if such functionality is not provided or not needed.

The MCP jackpot cycle may be initiated (318) and, if delayed seed functionality is included in the implementation, a portion of the secondary currency seed amount may be transferred into an escrow associated with the secondary currency meter (320). This portion is determined by subtracting the secondary currency initial meter value from the secondary currency seed amount; the remaining secondary seed amount is placed into the escrow. The non-escrowed portion of the secondary currency seed amount may be added to the secondary currency meter (322). In implementations where no delayed seeding is implemented, the secondary currency meter may be initialized using the entire secondary currency seed amount.

After the secondary currency meter has been initialized, the MCP jackpot cycle may begin (324), and qualifying wagers from both the primary currency and the secondary currency may make contributions to the MCP jackpot (328). During this period, if there are escrowed secondary currency funds associated with the secondary currency meter, those funds may be transferred from the escrow to the secondary currency meter over a period of time (326).

At some point, a player may win the MCP jackpot (330). The MCP jackpot may be paid out in the appropriate currency, and a decision may be made as to whether or not another MCP jackpot cycle should be initiated (332). If so, the technique may return to step 312 and continue as before, although various parameters may change based on what the relevant exchange rate is. If not, the technique may end (334) and the jackpot may be deactivated.

Figure 4:
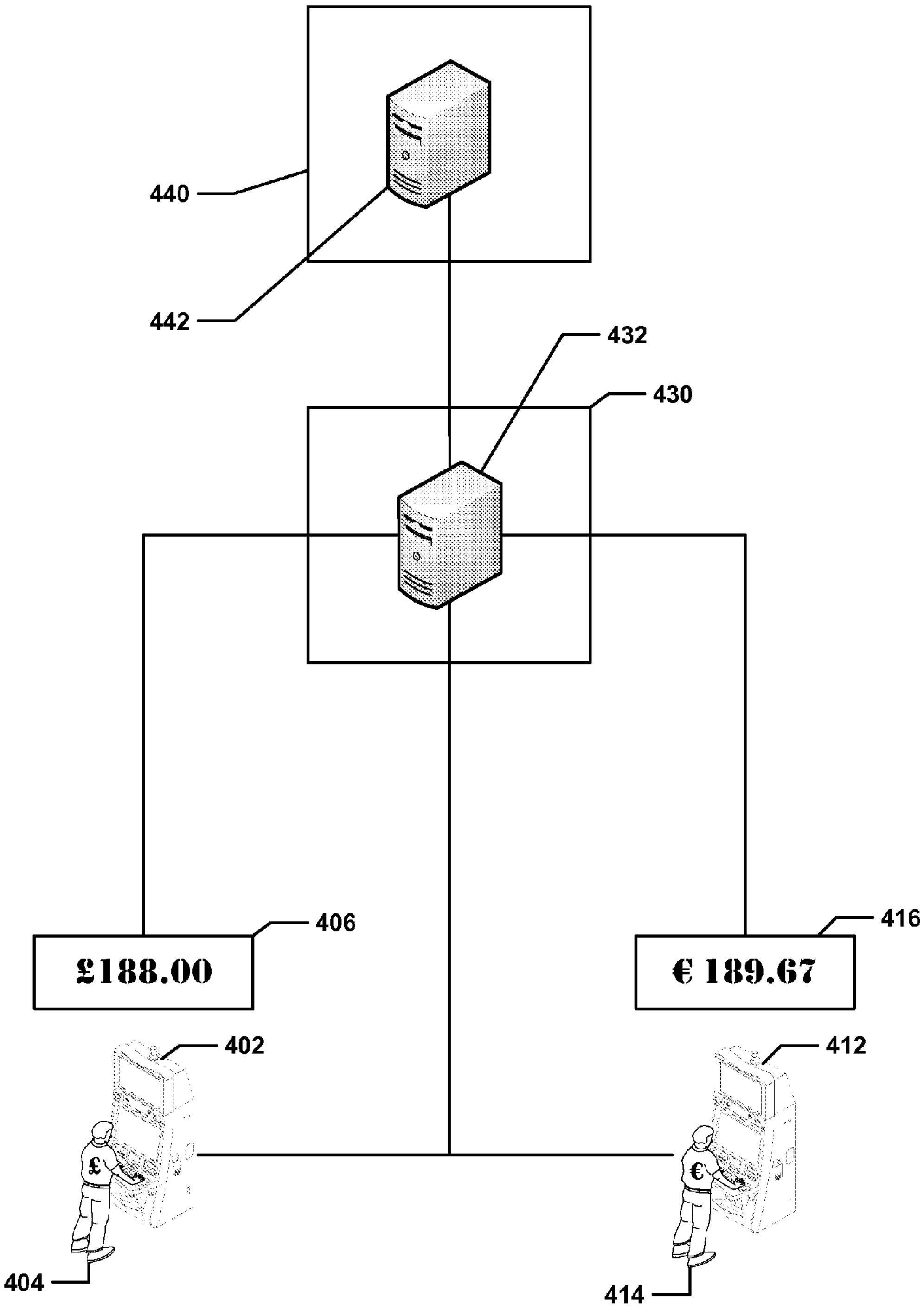
FIG. 4 depicts a high-level diagram of a system which may be used to implement the techniques outlined herein.

The techniques discussed herein may be implemented on any of a variety of systems or devices. For example, FIG. 4 depicts a high-level diagram of apparatuses which may be used to implement an MCP system. In FIG. 4, gaming machine 402 is configured to receive wagers made in British £, which may be the primary currency for the MCP jackpot which is to be provided. Player 404 may make wagers on gaming machine 402 in British £, and may be eligible to participate in the MCP jackpot as a result. Gaming machine 412 is configured to receive wagers made in EU €, which may be a secondary currency for the MCP jackpot which is to be provided. Player 414 may make wagers on gaming machine 412 in EU €, and may be eligible to participate in the MCP jackpot as a result. MCP server 432 may be configured to monitor game play on gaming machines 402 and 412, and receive indications of contributions from each qualifying wager made on gaming machines 402 and 412 which are to be added to the MCP jackpot amount. In other implementations, wagering machines 402 and 412 may determine when a qualifying wager has been made and may provide an indication to MCP server 432 of the appropriate contribution from the qualifying wager. MCP server 432 may be configured to implement MCP techniques as described in this paper, such as, for example, the technique outlined in FIG. 3. MCP server 432 may, for example, communicate with primary currency meter 406 and instruct the meter to indicate the current value of the MCP for British £ wagerers, and may communicate with secondary currency meter 416 and instruct the meter to indicate the current value of the MCP for EU € wagerers. MCP server 432, which may be located within a remote area 430, such as a gaming establishment operations center or an off-site operations center, may be further configured to communicate with exchange rate reporting server 442, which may be located at, for example, a financial services provider. MCP server 432 may be configured to query exchange rate reporting server 442 periodically to obtain up-to-date exchange rate data for use in implementing MCPs.

While FIG. 4 depicts only one gaming machine for each currency, in practice, many gaming machines may be in communication with MCP server 432. In some implementations, gaming machines 402 and 412 may actually be personal computers which may access Internet gambling sites and provide wagering games over the Internet. A player may, in such situations, be confined to wagering in the currency of the jurisdiction in which the computer is in. However, other implementations may allow a player to specify which currency they wish to use. In some implementations, an MCP may receive contributions both from gaming machines which are located in casinos or other gaming venues and from personal computers engaging in Internet-based wagering game play.

It is to be understood as well that while FIG. 4 depicts only one MCP server 432, the functionality of MCP server 432 may be distributed across multiple servers or other devices, and may be distributed across multiple locations. For example, an MCP system may include one server which monitors exchange rates and adjusts MCP jackpot parameters for secondary currencies, a server which tracks wagering contributions from all currencies participating in the MCP, and other servers which each manage a different MCP jackpot currency meter using information from the server which tracks wagering contributions and the data from the server which provides MCP jackpot parameters for the secondary currencies.

Figure 5A:
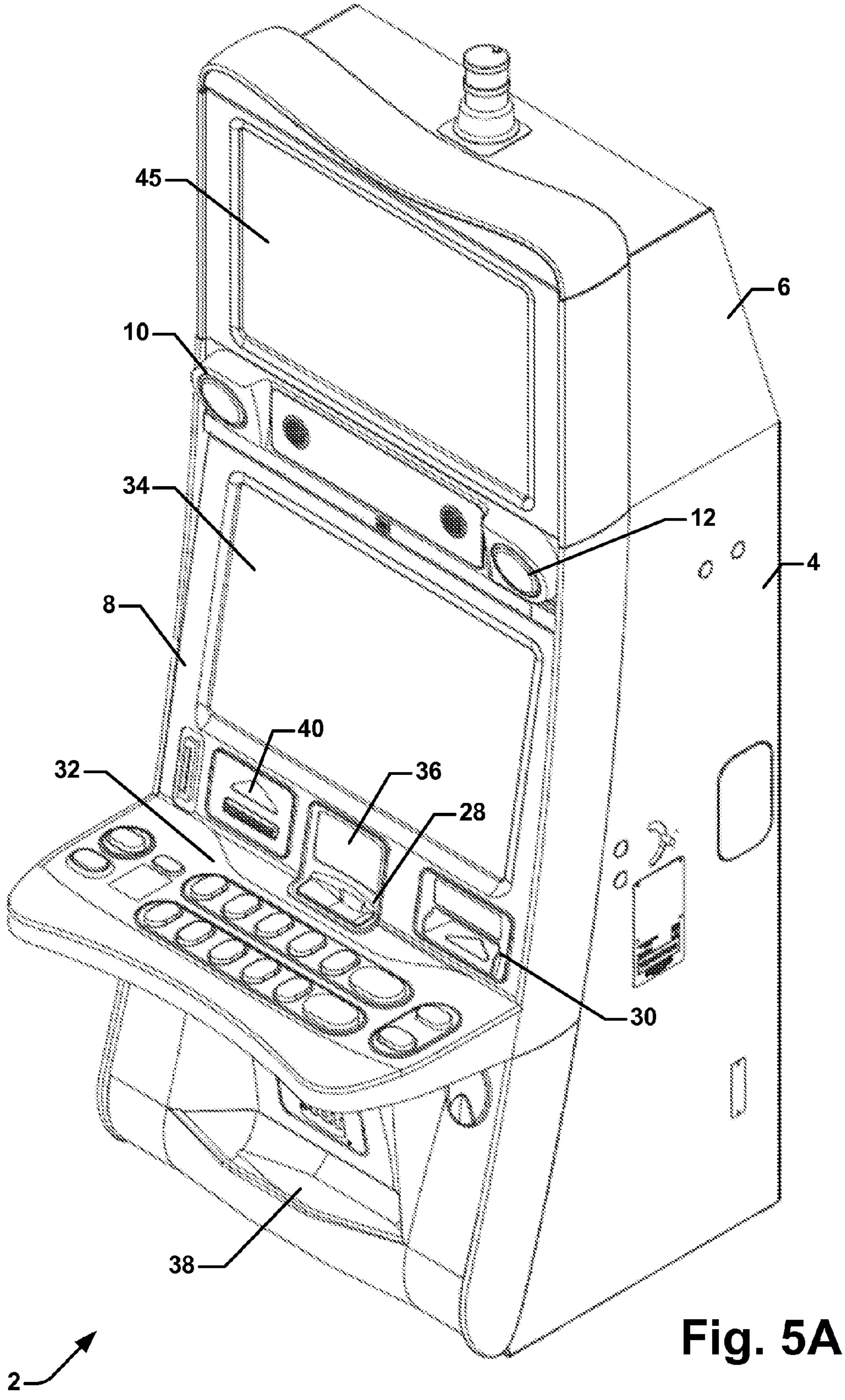
FIGS. 5A-5C depict isometric, front, and side views, respectively, of a wagering game machine which may be used in implementing the techniques described herein.
Figure 5B:
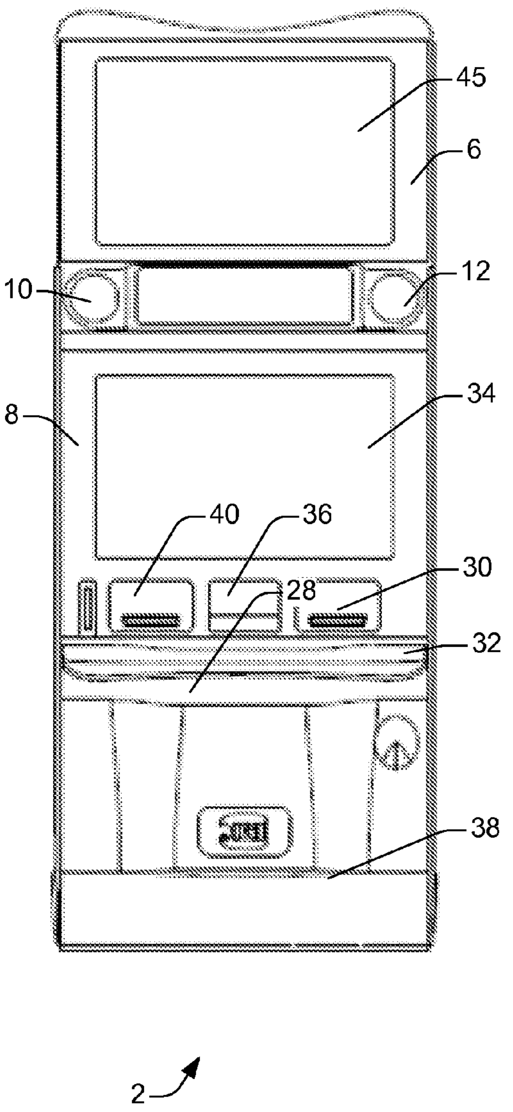
Figure 5C:
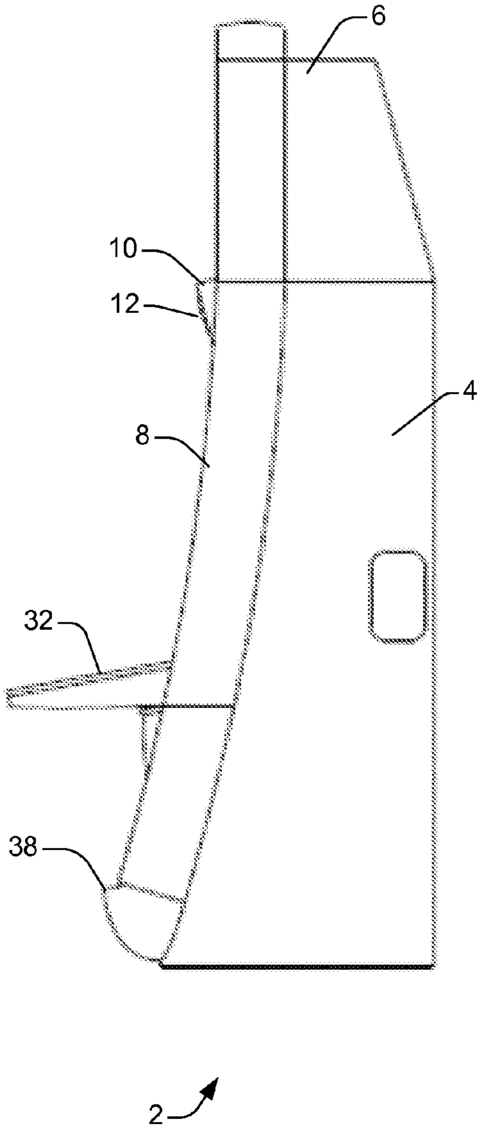

FIGS. 5A, 5B, and 5C show isometric, front, and side views, respectively, of a gaming machine 2, which may be used to support various implementations of MCPs as discussed herein. As illustrated in FIGS. 5A-5C, gaming machine 2 includes a main cabinet 4, which generally surrounds the machine interior and is viewable by users. The main cabinet includes a main door 8 on the front of the machine, which opens to provide access to the interior of the machine.

In some implementations, the electronic gaming machine may include any of a plurality of devices. For example, the electronic gaming machine may include a ticket printer that prints bar-coded tickets, a key pad for entering player tracking information, a display (e.g., a video display screen) for displaying player tracking information, a card reader for entering a magnetic striped card containing player tracking information, and any other devices. The ticket printer may be used to print tickets for a cashless ticketing system. In FIGS. 5A-5C, attached to the main door is a payment acceptor 28, a bill validator 30, and a coin tray 38. The payment acceptor may include a coin slot and/or a payment, note, or bill acceptor, where the player inserts money, coins, tokens, or other types of payments.

In some implementations, devices such as readers or validators for credit cards, debit cards, smart cards, or credit slips may facilitate payment. For example, a player may insert an identification card into a card reader of the gaming machine. The identification card may be a smart card coded with a player's identification, credit totals (or related data) and other relevant information. As another example, a player may carry a portable device, such as a cell phone, a radio frequency identification tag or any other suitable wireless device. The portable device may communicates a player's identification, credit totals (or related data), and/or any other relevant information to the gaming machine. As yet another example, money may be transferred to a gaming machine through electronic funds transfer. When a player funds the gaming machine, another logic device coupled to the gaming machine may determine the amount of funds entered and display the corresponding amount on a display device.

In some implementations, attached to the main door are a plurality of player-input switches or buttons 32. The input switches can include any suitable devices which enables the player to produce an input signal which is received by the processor. The input switches may include a game activation device that may be used by the player to start any primary game or sequence of events in the gaming machine. The game activation device can be any suitable play activator such as a "bet one" button, a "max bet" button, or a "repeat the bet" button. In some instances, upon appropriate funding, the gaming machine may begin the game play automatically. Alternately, the gaming machine may automatically activate game play after detecting user input via the game activation device.

In some implementations, one input switch is a cash-out button. The player may push the cash-out button and cash out to receive a cash payment or other suitable form of payment corresponding to the number of remaining credits. For example, when the player cashes out, the player may receive the coins or tokens in a coin payout tray. As another example, the player may receive other payout mechanisms such as tickets or credit slips redeemable by a cashier (or other suitable redemption system) or funding to the player's electronically recordable identification card. As yet another example, funds may be transferred from the gaming machine to the player's smart card.

In some implementations, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In some implementations, the gaming machine may include communication ports for enabling communication of the gaming machine processor with external peripherals, such as external video sources, expansion buses, game or other displays, a SCSI port, a key pad, or a network interface for communicating via a network.

In some implementations, the gaming machine may include a label area, such as the label area 36. The label area may be used to display any information or insignia related to activities conducted at the gaming machine.

In some implementations, the electronic gaming machine may include one or more display devices. For example, the electronic gaming machine 2 includes display devices 34 and 45. The display devices 34 and 45 may each include any of a cathode ray tube, an LCD, a light emitting diode (LED) based display, an organic light emitting diode (OLED) based display, a polymer light emitting diode (PLED) based display, an SED based-display, an E-ink display, a plasma display, a television display, a display including a projected and/or reflected image, or any other suitable electronic display device.

In some implementations, the display devices at the gaming machine may include one or more electromechanical devices such as one or more rotatable wheels, reels, or dice. The display device may include an electromechanical device adjacent to a video display, such as a video display positioned in front of a mechanical reel. The display devices may include dual-layered or multi-layered electromechanical and/or video displays that cooperate to generate one or more images. The display devices may include a mobile display device, such as a smart phone or tablet computer, that allows play of at least a portion of the primary or secondary game at a location remote from the gaming machine. The display devices may be of any suitable size and configuration, such as a square, a rectangle or an elongated rectangle.

In some implementations, the display devices of the gaming machine are configured to display game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the electronic gaming machine may include a top box. For example, the gaming machine 2 includes a top box 6, which sits on top of the main cabinet 4. The top box 6 may house any of a number of devices, which may be used to add features to a game being played on the gaming machine 2. These devices may include speakers 10 and 12, display device 45, and any other devices. Further, the top box 6 may house different or additional devices not illustrated in FIGS. 1-2B. For example, the top box may include a bonus wheel or a back-lit silk screened panel which may be used to add bonus features to the game being played on the gaming machine. As another example, the top box may include a display for a progressive jackpot offered on the gaming machine. As yet another example, the top box may include a smart card interaction device. During a game, these devices are controlled and powered, at least in part, by circuitry (e.g. a master gaming controller) housed within the main cabinet 4 of the machine 2.

In some implementations, speakers may be mounted and situated in the cabinet with an angled orientation toward the player. For instance, the speakers 10 and 12 located in top box area 6 of the upper region of gaming machine 2 may be mounted and situated in the cabinet with an angled orientation down towards the player and the floor. In one example, the angle is 45 degrees with respect to the vertical, longitudinal axis of machine 2. In another example, the angle is in a range of 30-60 degrees. In another example, the angle is any angle between 0 and 90 degrees. In some implementations, the angle of speakers in the gaming machine may be adjustable. For instance, speakers may be adjusted to face in a direction more closely approximating an estimated position of a player's head or facial features.

The bill validator 30, player-input switches 32, display screen 34, and other gaming devices may be used to present a game on the game machine 2. The devices may be controlled by code executed by a master gaming controller housed inside the main cabinet 4 of the machine 2. The master gaming controller may include one or more processors including general purpose and specialized processors, such as graphics cards, and one or more memory devices including volatile and non-volatile memory. The master gaming controller may periodically configure and/or authenticate the code executed on the gaming machine.

In some implementations, the gaming machine may include a sound generating device coupled to one or more sounds cards. The sound generating device may include one or more speakers or other sound generating hardware and/or software for generating sounds, such as playing music for the primary and/or secondary game or for other modes of the gaming machine, such as an attract mode. The gaming machine may provide dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In some implementations, the gaming machine may include a sensor, such as a camera that is selectively positioned to acquire an image of a player actively using the gaming machine and/or the surrounding area of the gaming machine. The sensor may be configured to capture biometric data about a player in proximity to the gaming machine. The biometric data may be used to implement mechanical and/or digital adjustments to the gaming machine. Alternately, or additionally, the sensor may be configured to selectively acquire still or moving (e.g., video) images. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol, animated avatar, or game indicia. In some implementations, the sensor may be used to trigger an attract mode effect. For example, when the sensor detects the presence of a nearby player, the gaming machine may play sound effects or display images, text, graphics, lighting effects, or animations to attract the player to play a game at the gaming machine.

Gaming machine 2 is but one example from a wide range of gaming machine designs on which the techniques described herein may be implemented. For example, not all suitable gaming machines have top boxes or player tracking features. Further, some gaming machines have only a single game display—mechanical or video, while others may have multiple displays. As mentioned previously, the functionality of gaming machines, in the context of the present disclosure, may also be provided by personal computers providing wager gaming via the Internet.

Figure 6:
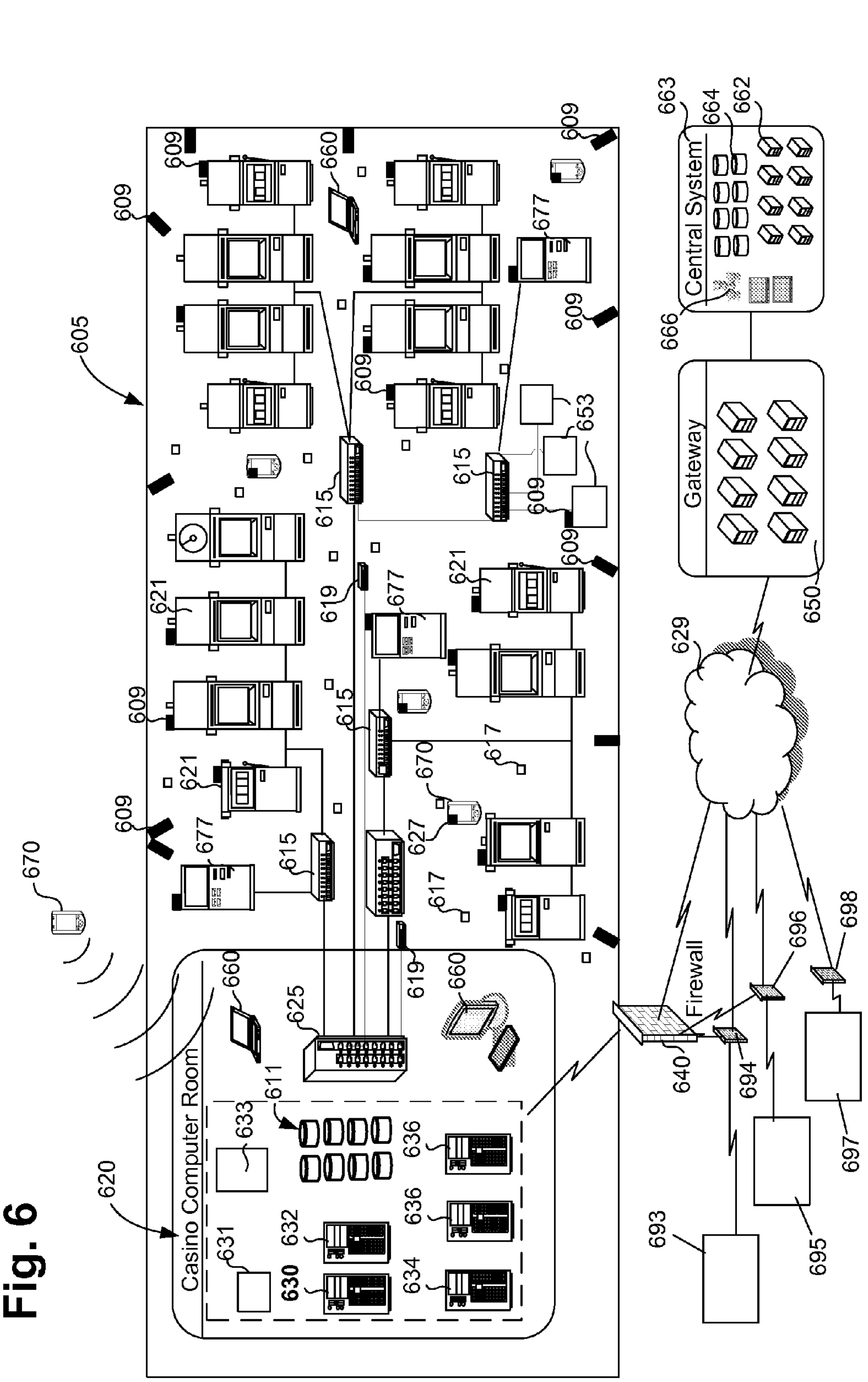
FIG. 6 depicts a high-level conceptual schematic of a wager gaming system which may be used to implement the techniques described herein.

FIG. 6 shows a server-based (Sb™) gaming network which may be used to implement some of the techniques or systems as described above. Those of skill in the art will realize that this architecture and the related functionality are merely examples and that the present disclosure encompasses many other such implementations and methods.

Here, casino computer room 620 and networked devices of a gaming establishment 605 are illustrated. Gaming establishment 605 is configured for communication with central system 663 via gateway 650. Gaming establishments 693 and 695 are also configured for communication with central system 663. Gaming establishments 693 and 695 may, for example be in jurisdictions using different currencies and may both offer games which participate in the same MCP.

In some implementations, gaming establishments may be configured for communication with one another. In this example, gaming establishments 693 and 695 are configured for communication with casino computer room 620. Such a configuration may allow devices and/or operators in casino 605 to communicate with and/or control devices in other casinos. In some such implementations, a server in computer room 620 may control devices in casino 605 and devices in other gaming establishments. Conversely, devices and/or operators in another gaming establishment may communicate with and/or control devices in casino 605.

Here, gaming establishment 697 is configured for communication with central system 663, but is not configured for communication with other gaming establishments. Some gaming establishments (not shown) may not be in communication with other gaming establishments or with a central system. Gaming establishment 605 includes multiple gaming machines 621, each of which is part of a bank 610 of gaming machines 621. In this example, gaming establishment 605 also includes a bank of networked gaming tables 653. However, the present disclosure may be implemented in gaming establishments having any number of gaming machines, gaming tables, etc. It will be appreciated that many gaming establishments include hundreds or even thousands of gaming machines 621 and/or gaming tables 653, not all of which are necessarily included in a bank and some of which may not be connected to a network. At least some of gaming machines 621 and/or mobile devices 670 may be "thin clients" that are configured to perform client-side methods as described elsewhere herein. Gaming machines 621 may, for example, be configured to provide the first and second levels of access and issue and receive temporary IDs, much as gaming machines 405 and 410 are configured.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 653 may be configured for communication with individual player terminals (not shown), which may be configured to accept bets, present an electronic representation of a dealer, indicate game outcomes, etc.

Gaming establishment 605 also includes networked kiosks 677. Depending on the implementation, kiosks 677 may be used for various purposes, including but not limited to cashing out, prize redemption, redeeming points from a player loyalty program, redeeming "cashless" indicia such as bonus tickets, smart cards, generating temporary IDs, creating new player tracking accounts based on temporary IDs, etc. In some implementations, kiosks 677 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, kiosks 677 may be configured to receive information from a patron, e.g., such as temporary IDs or account creation data.

In this example, each bank 610 has a corresponding switch 615, which may be a conventional bank switch in some implementations. Each switch 615 is configured for communication with one or more devices in computer room 620 via main network device 625, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various implementations of the disclosure. IGT has also developed a gaming-industry-specific transport layer called CASH that rides on top of TCP/IP and offers additional functionality and security.

Here, gaming establishment 605 also includes an RFID network, implemented in part by RFID switches 619 and multiple RFID readers 617. An RFID network may be used, for example, to track objects (such as mobile gaming devices 670, which include RFID tags 627 in this example), patrons, etc., in the vicinity of gaming establishment 605.

As noted elsewhere herein, some implementations of the disclosure may involve "smart" player loyalty instruments, such as player tracking cards, which include an RFID tag. Accordingly, the location of such RFID-enabled player loyalty instruments may be tracked via the RFID network. In this example, at least some of mobile devices 670 may include an RFID tag 627, which includes encoded identification information for the mobile device 670. Accordingly, the locations of such tagged mobile devices 670 may be tracked via the RFID network in gaming establishment 605. Other location-detection devices and systems, such as the global positioning system ("GPS"), may be used to monitor the location of people and/or devices in the vicinity of gaming establishment 605 or elsewhere.

Various alternative network topologies can be used to implement different implementations of the disclosure and/or to accommodate varying numbers of networked devices. For example, gaming establishments with large numbers of gaming machines 621 may require multiple instances of some network devices (e.g., of main network device 625, which combines switching and routing functionality in this example) and/or the inclusion of other network devices not shown in FIG. 6. Some implementations of the disclosure may include one or more middleware servers disposed between kiosks 677, RFID switches 619 and/or bank switches 615 and one or more devices in computer room 620 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic. In some implementations, middleware servers may provide intermediate data handling and processing for implementing MCPs—for example, a middleware server may collect wager contributions from several banks of gaming machines and forward them on the MCP server 432.

Storage devices 611, Sb™ server 630, License Manager 631, Arbiter 633, servers 632, 634, 636 and 638, host device(s) 660 and main network device 625 are disposed within computer room 620 of gaming establishment 605. In practice, more or fewer devices may be used. Depending on the implementation, some such devices may reside in gaming establishment 605 or elsewhere.

One or more devices in central system 663 may also be configured to perform, at least in part, tasks specific to the present disclosure, such as the functions which may be performed by MCP server 432. For example, one or more servers 662, storage devices 664 and/or host devices 660 of central system 663 may be configured to implement the functions described in detail elsewhere herein.

One or more of the servers of computer room 620 may be configured with software for receiving a player's wager gaming notification parameters, determining when a wagering condition corresponds with the wager gaming notification parameters and/or providing a notification to the player when the wagering condition corresponds with the wager gaming notification parameters.

Other devices that may be deployed in network 605 do not appear in FIG. 6. For example, some gaming networks may include not only various radio frequency identification ("RFID") readers 617, but also RFID switches, middleware servers, etc., some of which are not depicted in FIG. 6. These features may provide various functions. For example, a server (or another device) may determine a location of a mobile device 670 according to the location of an RFID reader that reads an RFID tag 627.

The servers and other devices indicated in FIG. 6 may be configured for communication with other devices in or outside of gaming establishment 605, such as host devices 660, kiosks 677 and/or mobile devices 670, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some implementations of Sb™ server 630 and the other servers shown in FIG. 6 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the disclosure, many of these devices (including but not limited to License Manager 631, servers 632, 634, 636, and 638, and main network device 625) are mounted in a single rack with Sb™ server 630. Accordingly, many or all such devices will sometimes be referenced in the aggregate as an "Sb™ server." However, in alternative implementations, one or more of these devices is in communication with Sb™ server 630 and/or other devices of the network but located elsewhere. For example, some of the devices could be mounted in separate racks within computer room 620 or located elsewhere on the network. Moreover, it can be advantageous to store large volumes of data elsewhere via a storage area network ("SAN").

Computer room 620 may include one or more operator consoles or other host devices that are configured for communication with other devices within and outside of computer room 620. Such host devices may be provided with software, hardware and/or firmware for implementing various implementations of the disclosure. However, such host devices need not be located within computer room 620. Wired host devices 660 (which are desktop and laptop computers in this example) and wireless devices 670 (which are PDAs in this example) may be located elsewhere in gaming establishment 605 or at a remote location.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the invention.

What is claimed is:

1. A wager gaming method comprising:

a) identifying a primary currency for participation in a multi-currency progressive (MCP) jackpot having an MCP jackpot cycle;

b) determining an overall return-to-player (RTP) for the MCP jackpot with respect to the primary currency;

c) identifying a secondary currency for participation in the MCP jackpot, the secondary currency different from the primary currency;

d) determining an exchange rate between the primary currency and the secondary currency, the exchange rate temporally linked to the MCP jackpot cycle;

e) determining, using one or more processors, a seed amount of the secondary currency that, when added to an amount of average total expected wager contributions for the MCP jackpot during the MCP jackpot cycle, produces an overall RTP for the MCP jackpot with respect to the secondary currency that is substantially the same as the overall RTP for the MCP jackpot with respect to the primary currency;

f) initializing a primary currency meter;

g) initializing a secondary currency meter with at least a first amount of the seed amount;

h) offering the MCP jackpot for play;

i) updating the primary currency meter and the secondary currency meter based on game play;

j) determining that the MCP jackpot has been won by a first wager, wherein the first wager is received in the primary currency or the secondary currency; and k) awarding an amount indicated by whichever of the primary currency meter and the secondary currency meter corresponds with the currency of the first wager.

2. The wager gaming method of claim 1, the method further comprising:

l) transferring a second amount of the seed amount into a secondary escrow associated with the secondary currency meter; and m) transferring one or more portions of the second amount to the secondary currency meter from the secondary escrow while the MCP jackpot is offered for play.

3. The wager gaming method of claim 2, wherein the transferring from the secondary escrow to the secondary currency meter occurs over an extended period of time and until the second amount of the secondary currency is entirely transferred to the secondary currency meter.

4. The wager gaming method of claim 2, wherein the transferring occurs at a first rate, the first rate calculated based on the second amount of the secondary currency and a predicted average duration of the MCP jackpot cycle.

5. The wager gaming method of claim 1, the method further comprising:

l) receiving one or more first monetary contributions towards the MCP jackpot from a first gaming machine, each first monetary contribution taken from a wager in the primary currency on the first gaming machine;

m) receiving one or more second monetary contributions towards the MCP jackpot from a second gaming machine, each second monetary contribution taken from a wager in the secondary currency on the second gaming machine;

n) incrementing the primary currency meter by each received first monetary contribution;

o) incrementing the primary currency meter by an amount of the primary currency equal to each received second monetary contribution in absolute monetary terms;

p) incrementing the secondary currency meter by each received second monetary contribution; and q) incrementing the secondary currency meter by an amount of the secondary currency equal to each received first monetary contribution in absolute monetary terms.

6. The wager gaming method of claim 5, wherein the method further comprises:

repeating steps l), n), and o) for one or more additional first gaming machines;

repeating steps m), p), and q) for one or more additional second gaming machines;

resetting the first currency meter and the secondary currency meter after awarding the amount; and initiating another MCP jackpot cycle.

7. The wager gaming method of claim 5, wherein each first monetary contribution is equal to each second monetary contribution in absolute monetary terms.

8. The wager gaming method of claim 5, the method further comprising:

r) transferring a second amount of the seed amount into a secondary escrow associated with the secondary currency meter; and s) transferring one or more portions of the second amount to the secondary currency meter from the secondary escrow while the MCP jackpot is offered for play, wherein:

the transferring from the secondary escrow to the secondary currency meter occurs each time the secondary currency meter is incremented, and the portions transferred are each substantially equal to the second amount of the secondary currency divided by a predicted average number of first and second monetary contributions that will be received during the MCP jackpot cycle.

9. The wager gaming method of claim 1, wherein steps a) through k) are repeated for multiple MCP jackpot cycles.

10. The wager gaming method of claim 9, further comprising:

for each MCP jackpot cycle, initializing the secondary currency meter with at least the first amount of the seed amount, wherein, for each MCP jackpot cycle, the first amount is the same.

11. The wager gaming method of claim 1, wherein the first amount is a round number.

12. The wager gaming method of claim 1, wherein the first amount is a multiple of 5.

13. The wager gaming method of claim 1, further comprising:

identifying one or more additional, different secondary currencies for participation in the MCP jackpot; and repeating steps c) through e) for each of the one or more additional, different secondary currencies.

14. A wager gaming system comprising:

one or more servers, the one or more servers including a memory, one or more processors, an input interface, and a communications link communicatively connected with each other, the one or more servers configured to:

a) receive input, via the input interface, identifying a primary currency for participation in a multi-currency progressive (MCP) jackpot having an MCP jackpot cycle;

b) receive information, via the input interface, indicating an overall return-to-player (RTP) for the MCP jackpot with respect to the primary currency;

c) receive, via the input interface, input identifying a secondary currency for participation in the MCP jackpot, the secondary currency different from the primary currency;

d) retrieve, via the communications link, an exchange rate between the primary currency and the secondary currency, the exchange rate temporally linked to the MCP jackpot cycle;

e) determine a seed amount of the secondary currency that, when added to an amount of average total expected wager contributions for the MCP jackpot during the MCP jackpot cycle, produces an overall RTP for the MCP jackpot with respect to the secondary currency that is substantially the same as the overall RTP for the MCP jackpot with respect to the primary currency;

f) initialize a primary currency meter;

g) initialize a secondary currency meter with at least a first amount of the seed amount;

h) offer the MCP jackpot for play;

i) update the primary currency meter and the secondary currency meter based on game play;

j) determine that the MCP jackpot has been won by a first wager, wherein the first wager is received in the primary currency or the secondary currency; and k) award an amount indicated by whichever of the primary currency meter and the secondary currency meter corresponds with the currency of the first wager.

15. The wager gaming system of claim 14, the one or more servers further configured to:

l) transfer a second amount of the seed amount into a secondary escrow associated with the secondary currency meter; and m) transfer one or more portions of the second amount to the secondary currency meter from the secondary escrow while the MCP jackpot is offered for play.

16. The wager gaming system of claim 15, wherein the one or more servers is further configured to transfer the one or more portions of the second amount from the secondary escrow to the secondary currency meter over an extended period of time and until the second amount of the secondary currency is entirely transferred to the secondary currency meter.

17. The wager gaming system of claim 15, wherein the one or more servers is further configured to transfer the one or more portions of the second amount from the secondary escrow to the secondary currency meter at a first rate, the first rate calculated based on the second amount of the secondary currency and a predicted average duration of the MCP jackpot cycle.

18. The wager gaming system of claim 14, the one or more servers further configured to:

l) receive one or more first monetary contributions towards the MCP jackpot from a first gaming machine, each first monetary contribution taken from a wager in the primary currency on the first gaming machine;

m) receive one or more second monetary contributions towards the MCP jackpot from a second gaming machine, each second monetary contribution taken from a wager in the secondary currency on the second gaming machine;

n) increment the primary currency meter by each received first monetary contribution;

o) increment the primary currency meter by an amount of the primary currency equal to each received second monetary contribution in absolute monetary terms;

p) increment the secondary currency meter by each received second monetary contribution; and q) increment the secondary currency meter by an amount of the secondary currency equal to each received first monetary contribution in absolute monetary terms.

19. The wager gaming system of claim 18, the one or more servers further configured to:

repeat steps l), n), and o) for one or more additional first gaming machines;

repeat steps m), p), and q) for one or more additional second gaming machines;

reset the first currency meter and the secondary currency meter after awarding the amount; and initiate another MCP jackpot cycle.

20. The wager gaming system of claim 18, wherein each first monetary contribution is equal to each second monetary contribution in absolute monetary terms.

21. The wager gaming system of claim 18, the one or more servers further configured to:

r) transfer a second amount of the seed amount into a secondary escrow associated with the secondary currency meter;

s) transfer one or more portions of the second amount to the secondary currency meter from the secondary escrow while the MCP jackpot is offered for play, wherein:

the one or more servers is further configured to transfer the one or more portions of the second amount from the secondary escrow to the secondary currency meter each time the secondary currency meter is incremented, and the portions transferred are each substantially equal to the second amount of the secondary currency divided by a predicted average number of first and second monetary contributions that will be received during the MCP jackpot cycle.

22. The wager gaming system of claim 14, the one or more servers further configured to repeat a) through k) for multiple MCP jackpot cycles.

23. The wager gaming system of claim 22, the one or more servers further configured to, for each MCP jackpot cycle, initialize the secondary currency meter with at least the first amount of the seed amount, wherein, for each MCP jackpot cycle, the first amount is the same.

24. The wager gaming system of claim 14, wherein the first amount is a round number.

25. The wager gaming system of claim 14, wherein the first amount is a multiple of 5.

26. The wager gaming system of claim 14, the one or more servers further configured to:

receive, via the input interface, input identifying one or more additional, different secondary currencies for participation in the MCP jackpot; and repeat c) through e) for each of the one or more additional, different secondary currencies.

27. Computer software stored on at least one non-transitory machine-readable medium, the computer software including instructions for controlling devices in a gaming network to perform the following steps:

a) identifying a primary currency for participation in a multi-currency progressive (MCP) jackpot having an MCP jackpot cycle;

b) determining an overall return-to-player (RTP) for the MCP jackpot with respect to the primary currency;

c) identifying a secondary currency for participation in the MCP jackpot, the secondary currency different from the primary currency;

d) determining an exchange rate between the primary currency and the secondary currency, the exchange rate temporally linked to the MCP jackpot cycle; and e) determining a seed amount of the secondary currency that, when added to an amount of average total expected wager contributions for the MCP jackpot during the MCP jackpot cycle, produces an overall RTP for the MCP jackpot with respect to the secondary currency that is substantially the same as the overall RTP for the MCP jackpot with respect to the primary currency;

f) initializing a primary currency meter;

g) initializing a secondary currency meter with at least a first amount of the seed amount;

h) offering the MCP jackpot for play;

i) updating the primary currency meter and the secondary currency meter based on game play;

j) determining that the MCP jackpot has been won by a first wager, wherein the first wager is received in the primary currency or the secondary currency; and k) awarding an amount indicated by whichever of the primary currency meter and the secondary currency meter corresponds with the currency of the first wager.

28. The computer software stored on the at least one non-transitory machine-readable medium of claim 27, the software further comprising:

l) transferring a second amount of the seed amount into a secondary escrow associated with the secondary currency meter;

m) transferring one or more portions of the second amount to the secondary currency meter from the secondary escrow while the MCP jackpot is offered for play.

29. The computer software stored on the at least one non-transitory machine-readable medium of claim 28, wherein the transferring from the secondary escrow to the secondary currency meter occurs over an extended period of time and until the second amount of the secondary currency is entirely transferred to the secondary currency meter.

30. The computer software stored on the at least one non-transitory machine-readable medium of claim 28, wherein the transferring occurs at a first rate, the first rate calculated based on the second amount of the secondary currency and a predicted average duration of the MCP jackpot cycle.

31. The computer software stored on the at least one non-transitory machine-readable medium of claim 27, the software further comprising instructions for controlling the devices in the gaming network to perform the following steps:

l) receiving one or more first monetary contributions towards the MCP jackpot from a first gaming machine, each first monetary contribution taken from a wager in the primary currency on the first gaming machine;

m) receiving one or more second monetary contributions towards the MCP jackpot from a second gaming machine, each second monetary contribution taken from a wager in the secondary currency on the second gaming machine;

n) incrementing the primary currency meter by each received first monetary contribution;

o) incrementing the primary currency meter by an amount of the primary currency equal to each received second monetary contribution in absolute monetary terms;

p) incrementing the secondary currency meter by each received second monetary contribution; and q) incrementing the secondary currency meter by an amount of the secondary currency equal to each received first monetary contribution in absolute monetary terms.

32. The computer software stored on the at least one non-transitory machine-readable medium of claim 31, the software further comprising instructions for controlling the devices in the gaming network to perform the following steps:

repeating steps l), n), and o) for one or more additional first gaming machines;

repeating steps m), p), and q) for one or more additional second gaming machines;

resetting the first currency meter and the secondary currency meter after awarding the amount; and initiating another MCP jackpot cycle.

33. The computer software stored on the at least one non-transitory machine-readable medium of claim 31, wherein each first monetary contribution is equal to each second monetary contribution in absolute monetary terms.

34. The computer software stored on the at least one non-transitory machine-readable medium of claim 31, the software further comprising instructions for controlling the devices in the gaming network to perform the following steps:

r) transferring a second amount of the seed amount into a secondary escrow associated with the secondary currency meter; and s) transferring one or more portions of the second amount to the secondary currency meter from the secondary escrow while the MCP jackpot is offered for play, wherein:

the transferring from the secondary escrow to the secondary currency meter occurs each time the secondary currency meter is incremented, and the portions transferred are each substantially equal to the second amount of the secondary currency divided by a predicted average number of first and second monetary contributions that will be received during the MCP jackpot cycle.

35. The computer software stored on the at least one non-transitory machine-readable medium of claim 27, wherein steps a) through k) are repeated for multiple MCP jackpot cycles.

36. The computer software stored on the at least one non-transitory machine-readable medium of claim 35, the software further comprising instructions for controlling the devices in the gaming network to perform the following steps:

for each MCP jackpot cycle, initializing the secondary currency meter with at least the first amount of the seed amount, wherein, for each MCP jackpot cycle, the first amount is the same.

37. The computer software stored on the at least one non-transitory machine-readable medium of claim 27, wherein the first amount is a round number.

38. The computer software stored on the at least one non-transitory machine-readable medium of claim 27, wherein the first amount is a multiple of 5.

39. The computer software stored on the at least one non-transitory machine-readable medium of claim 27, the software further comprising instructions for controlling the devices in the gaming network to perform the following steps:

identifying one or more additional, different secondary currencies for participation in the MCP jackpot; and repeating steps c) through e) for each of the one or more additional, different secondary currencies.

* * * * *